United States Patent [19]

Takagi

[11] Patent Number: 5,652,741
[45] Date of Patent: Jul. 29, 1997

[54] DATA STORAGE APPARATUS HAVING DATA AND PARITY MEDIA

[75] Inventor: Shiro Takagi, Yokohama, Japan

[73] Assignee: Kabushiki Kaisha Toshiba, Kawasaki, Japan

[21] Appl. No.: 275,439

[22] Filed: Jul. 15, 1994

[30] Foreign Application Priority Data

Jul. 16, 1993 [JP] Japan .................................. 5-176960

[51] Int. Cl.⁶ .................................................. G11B 7/00
[52] U.S. Cl. .............................. 369/32; 369/58; 369/34; 369/53
[58] Field of Search ................................. 369/34, 36, 30, 369/58, 54, 48, 32, 53, 186; 395/275, 412, 417; 360/69

[56] References Cited

U.S. PATENT DOCUMENTS

| 5,121,483 | 6/1992 | Monahan et al. ........................... 369/30 |
| 5,148,432 | 9/1992 | Gordon et al. ........................... 371/10.1 |
| 5,459,848 | 10/1995 | Mase ........................................... 369/34 |

FOREIGN PATENT DOCUMENTS

| 2236714 | 9/1990 | Japan . |
| 5 28615 | 2/1993 | Japan . |

Primary Examiner—Nabil Z. Hindi
Attorney, Agent, or Firm—Cushman Darby & Cushman, L.L.P.

[57] ABSTRACT

There is provided a disk array apparatus designed to realize high-speed recovery processing in occurrence of an error while preventing a reduction in total storage capacity due to the use of parity disks. A disk with a high access frequency is set in a group constituted by a small number of disks, whereas a disk with a low access frequency is set in a group constituted by a large number of disks. In a group constituted by a small number of disks, since the number of disks used for recovery is small, the disk access frequency in recovery processing becomes low, and high-speed recovery processing can be realized. In a group constituted by a large number of disks, since the ratio of the parity disk capacity to the total capacity is low, a reduction in disk capacity is small.

9 Claims, 22 Drawing Sheets

(a) GROUP MANAGEMENT TABLE

| GROUP NUMBER | NUMBER OF DISKS | DATA DISK NUMBER ||||| PARITY DISK NUMBER |
|---|---|---|---|---|---|---|---|
| | | 1 | 2 | 3 | 4 | 5 | |
| 1 | 2 | 1 | | | | | 10 |
| 2 | 4 | 2 | 3 | 4 | | | 11 |
| 3 | 6 | 5 | 6 | 7 | 8 | 9 | 12 |

FIG. 2A (b) DISK MANAGEMENT TABLE

| DISK NUMBER | CELL NUMBER | ACCESS TIMES | ACCUMULATED ACCESS TIMES |
|---|---|---|---|
| 1 | 1 | 0 | 0 |
| 2 | 2 | 0 | 0 |
| 3 | 3 | 0 | 0 |
| 4 | 4 | 0 | 0 |
| 5 | 5 | 0 | 0 |
| 6 | 6 | 0 | 0 |
| 7 | 7 | 0 | 0 |
| 8 | 8 | 0 | 0 |
| 9 | 9 | 0 | 0 |
| 10 | 10 | 0 | 0 |
| 11 | 11 | 0 | 0 |
| 12 | 12 | 0 | 0 |

FIG. 2B (c) DRIVE MANAGEMENT TABLE

| DRIVE NUMBER | DISK NUMBER | ACCESS TIMES |
|---|---|---|
| 1 | 1 | 0 |
| 2 | 2 | 0 |
| 3 | 3 | 0 |
| 4 | 4 | 0 |

FIG. 2C

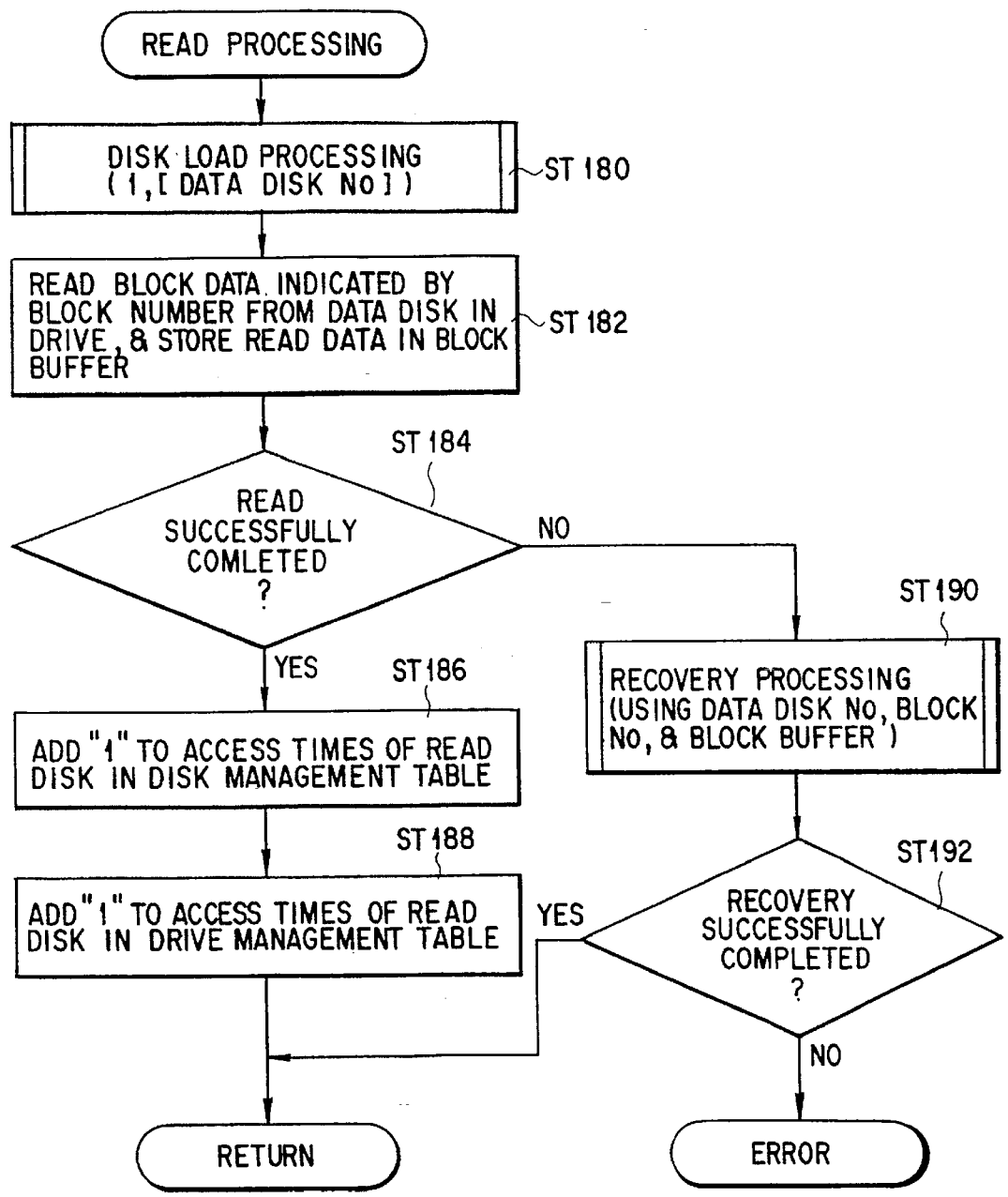
F I G. 4

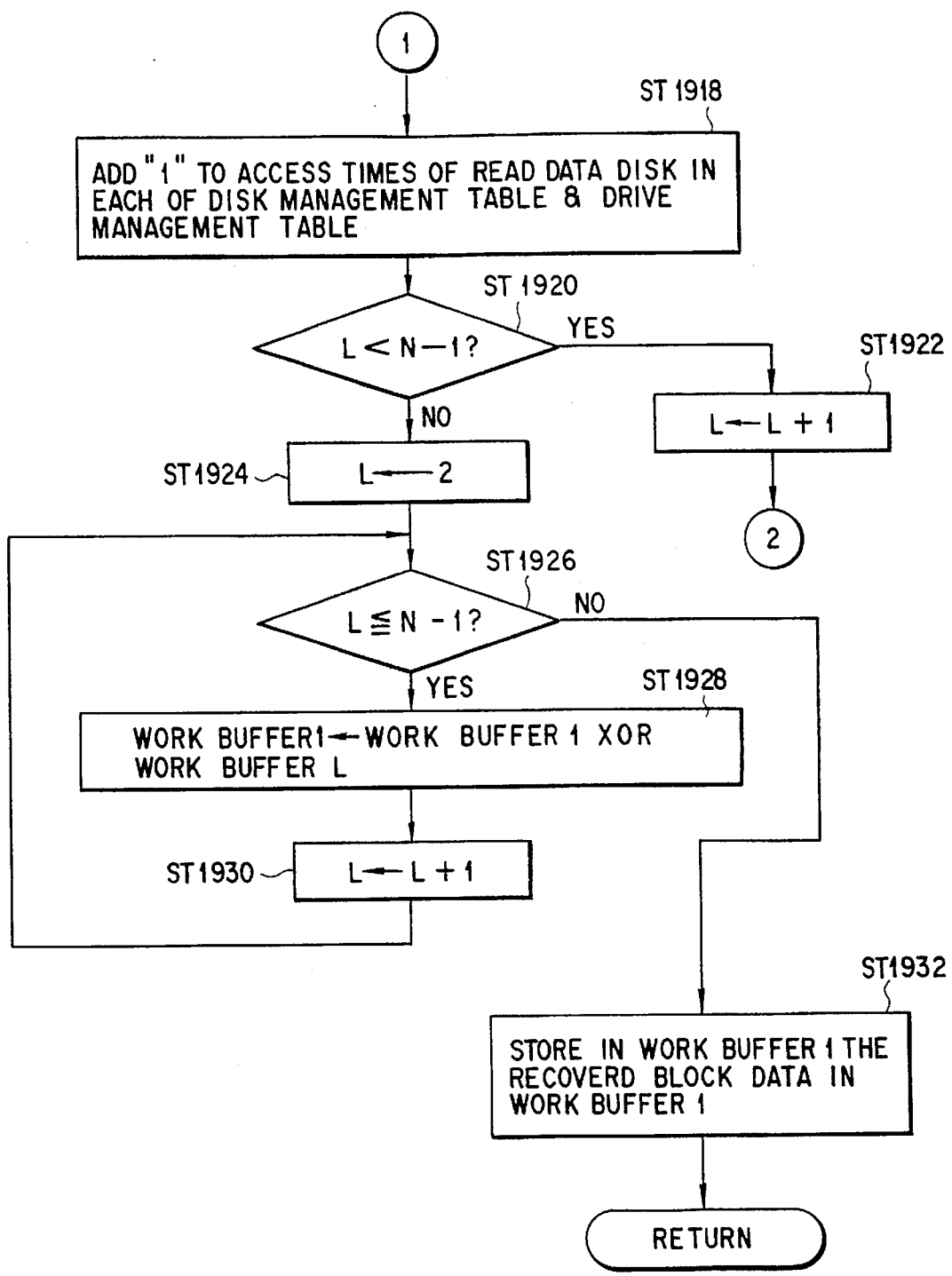
F I G. 7

(a) DRIVE MANAGEMENT TABLE

| DRIVE NUMBER | DISK NUMBER | ACCESS TIMES |
|---|---|---|
| 1 | 1 | 100 |
| 2 | 2 | 50 |
| 3 | 3 | 70 |
| 4 | 4 | 20 |

(b) DRIVE MANAGEMENT TABLE

| DRIVE NUMBER | DISK NUMBER | ACCESS TIMES |
|---|---|---|
| 1 | 1 | 0 |
| 2 | 2 | 0 |
| 3 | 3 | 0 |
| 4 | 7 | 0 |

F I G. 13B (a) GROUP MANAGEMENT TABLE

| GROUP NUMBER | NUMBER OF DISKS | DATA DISK NUMBER | | | | | PARITY DISK NUMBER |
|---|---|---|---|---|---|---|---|
| | | 1 | 2 | 3 | 4 | 5 | |
| 1 | 2 | 1 | / | / | / | / | 10 |
| 2 | 4 | 2 | 3 | 4 | / | / | 11 |
| 3 | 6 | 5 | 6 | 7 | 8 | 9 | 12 |

F I G. 14A (b) DISK MANAGEMENT TABLE

| DISK NUMBER | CELL NUMBER | ACCESS TIMES | ACCUMULATED ACCESS TIMES |
|---|---|---|---|
| 1 | 1 | 300 | 0 |
| 2 | 2 | 500 | 0 |
| 3 | 3 | 100 | 0 |
| 4 | 4 | 900 | 0 |
| 5 | 5 | 50 | 0 |
| 6 | 6 | 30 | 0 |
| 7 | 7 | 150 | 0 |
| 8 | 8 | 10 | 0 |
| 9 | 9 | 5 | 0 |
| 10 | 10 | 3 | 0 |
| 11 | 11 | 2 | 0 |
| 12 | 12 | 2 | 0 |

DATA DISK / PARITY DISK

F I G. 14B (a) GROUP MANAGEMENT TABLE

| GROUP NUMBER | NUMBER OF DISKS | DATA DISK NUMBER ||||| PARITY DISK NUMBER |
|---|---|---|---|---|---|---|---|
| | | 1 | 2 | 3 | 4 | 5 | |
| 1 | 2 | 4 | | | | | 10 |
| 2 | 4 | 2 | 1 | 7 | | | 11 |
| 3 | 6 | 3 | 5 | 6 | 8 | 9 | 12 |

FIG. 15A (b) DISK MANAGEMENT TABLE (AFTER SORTED)

| DISK NUMBER | CELL NUMBER | ACCESS TIMES | ACCUMULATED ACCESS TIMES |
|---|---|---|---|
| 4 | 1 | 900 | 0 |
| 2 | 2 | 500 | 0 |
| 1 | 3 | 300 | 0 |
| 7 | 4 | 150 | 0 |
| 3 | 5 | 100 | 0 |
| 5 | 6 | 50 | 0 |
| 6 | 7 | 30 | 0 |
| 8 | 8 | 10 | 0 |
| 9 | 9 | 5 | 0 |
| 10 | 10 | 3 | 0 |
| 11 | 11 | 2 | 0 |
| 12 | 12 | 2 | 0 |

FIG. 15B (c) DRIVE MANAGEMENT TABLE (AFTER SORTED)

| DRIVE NUMBER | DISK NUMBER | ACCESS TIMES |
|---|---|---|
| 1 | 4 | 0 |
| 3 | 2 | 0 |
| 2 | 1 | 0 |
| 4 | 7 | 0 |

FIG. 15C (a) GROUP MANAGEMENT TABLE

| GROUP NUMBER | NUMBER OF DISKS | DATA DISK NUMBER ||||| PARITY DISK NUMBER |
|---|---|---|---|---|---|---|---|
| | | 1 | 2 | 3 | 4 | 5 | |
| 1 | 2 | 4 | / | / | / | / | 10 |
| 2 | 4 | 2 | 1 | 7 | / | / | 11 |
| 3 | 6 | 3 | 5 | 6 | 8 | 9 | 12 |

FIG. 16A (b) DISK MANAGEMENT TABLE

| DISK NUMBER | CELL NUMBER | ACCESS TIMES | ACCUMULATED ACCESS TIMES |
|---|---|---|---|
| 1 | 1 | 0 | 300 |
| 2 | 2 | 0 | 500 |
| 3 | 3 | 0 | 100 |
| 4 | 4 | 0 | 900 |
| 5 | 5 | 0 | 50 |
| 6 | 6 | 0 | 30 |
| 7 | 7 | 0 | 150 |
| 8 | 8 | 0 | 10 |
| 9 | 9 | 0 | 5 |
| 10 | 10 | 0 | 3 |
| 11 | 11 | 0 | 2 |
| 12 | 12 | 0 | 2 |

(Disks 1–9: DATA DISK; Disks 10–12: PARITY DISK)

FIG. 16B

| DISK NUMBER | COMMAND ACCESS TIMES | ACCESS TIMES OF RECOVERY PROCESSING | RATE OF ACCESS | DISK COMMAND TIMES | |
|---|---|---|---|---|---|
| 1 | 80 | 1.2 | 0.625 | 30.5 | ↑ DATA DISK OF GROUP 1 |
| 2 | 7 | 8.5 | 0.119 | 13.7 | |
| 3 | 5 | 8.7 | 0.105 | 12.3 | ↓ |
| 4 | 2 | 0.3 | 0.018 | 2.3 | ↑ DATA DISK OF GROUP 2 |
| 5 | 2 | 0.3 | 0.018 | 2.3 | |
| 6 | 1 | 0.4 | 0.011 | 1.4 | ↓ |
| 7 | 1 | 0.2 | 0.009 | 1.2 | ↑ DATA DISK OF GROUP 3 |
| 8 | 1 | 0.2 | 0.009 | 1.2 | |
| 9 | 1 | 0.2 | 0.009 | 1.2 | ↓ |
| 10 | 0 | 9.2 | 0.071 | 8.5 | PARITY DISK OF GROUP 1 |
| 11 | 0 | 0.5 | 0.004 | 0.5 | PARITY DISK OF GROUP 2 |
| 12 | 0 | 0.3 | 0.002 | 0.5 | PARITY DISK OF GROUP 3 |
| TOTAL | 100 | 30.0 | 1.000 | 75.4 | |

FIG. 18

| DISK NUMBER | COMMAND ACCESS TIMES | ACCESS TIMES OF RECOVERY PROCESSING | RATE OF ACCESS | DISK COMMAND TIMES | |
|---|---|---|---|---|---|
| 1 | 80 | 0.0 | 0.694 | 24.5 | DATA DISK OF GROUP 1 |
| 2 | 7 | 0.7 | 0.068 | 7.2 | DATA DISK OF GROUP 2 |
| 3 | 5 | 0.9 | 0.051 | 5.6 | |
| 4 | 2 | 1.2 | 0.028 | 3.1 | |
| 5 | 2 | 0.4 | 0.021 | 2.3 | DATA DISK OF GROUP 3 |
| 6 | 1 | 0.5 | 0.013 | 1.5 | |
| 7 | 1 | 0.5 | 0.013 | 1.5 | |
| 8 | 1 | 0.5 | 0.013 | 1.5 | |
| 9 | 1 | 0.5 | 0.013 | 1.5 | |
| 10 | 0 | 8.0 | 0.069 | 7.4 | PARITY DISK OF GROUP 1 |
| 11 | 0 | 1.4 | 0.012 | 1.4 | PARITY DISK OF GROUP 2 |
| 12 | 0 | 0.6 | 0.005 | 0.6 | PARITY DISK OF GROUP 3 |
| TOTAL | 100 | 15.2 | 1.000 | 58.1 | |

FIG. 19

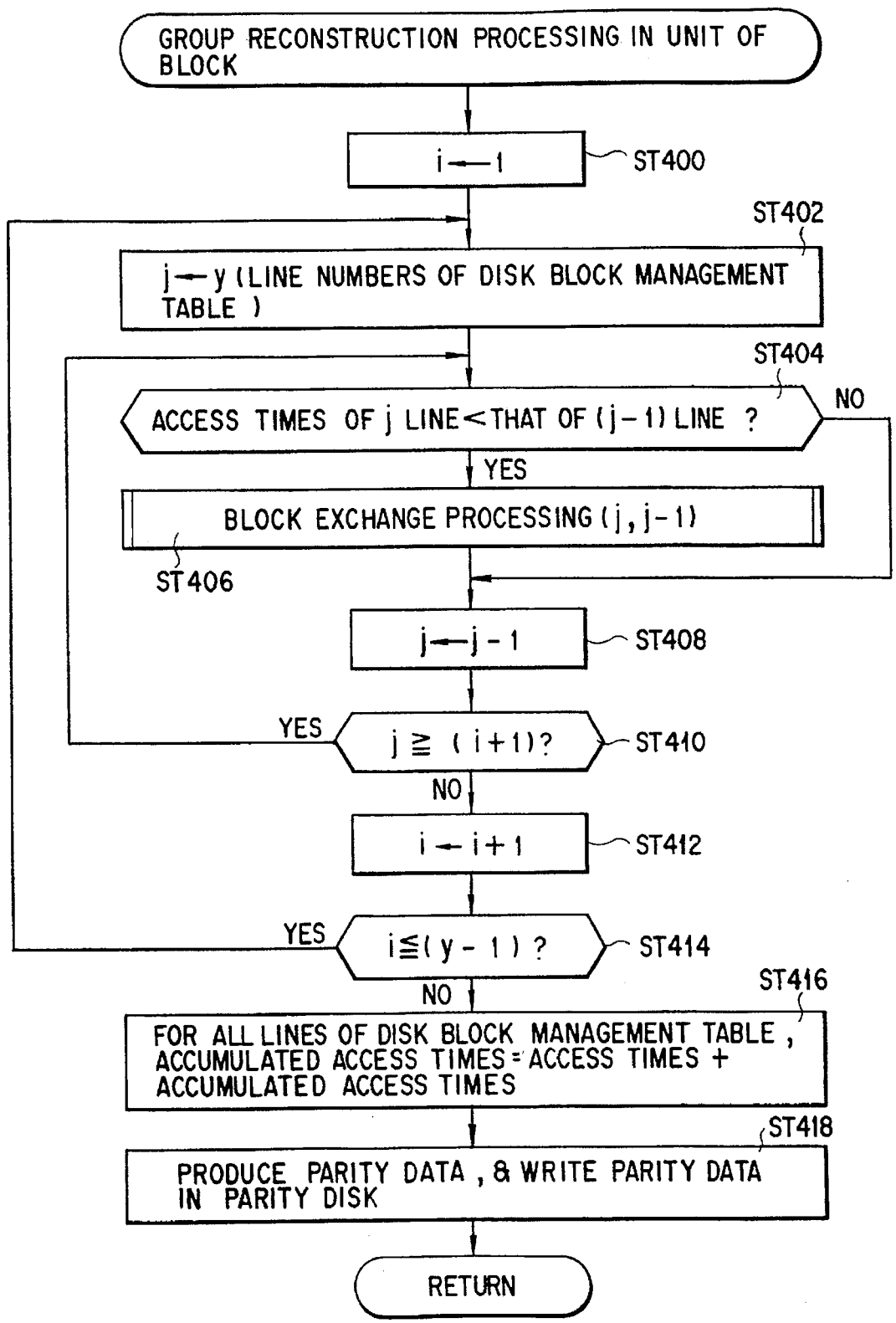
F I G. 20

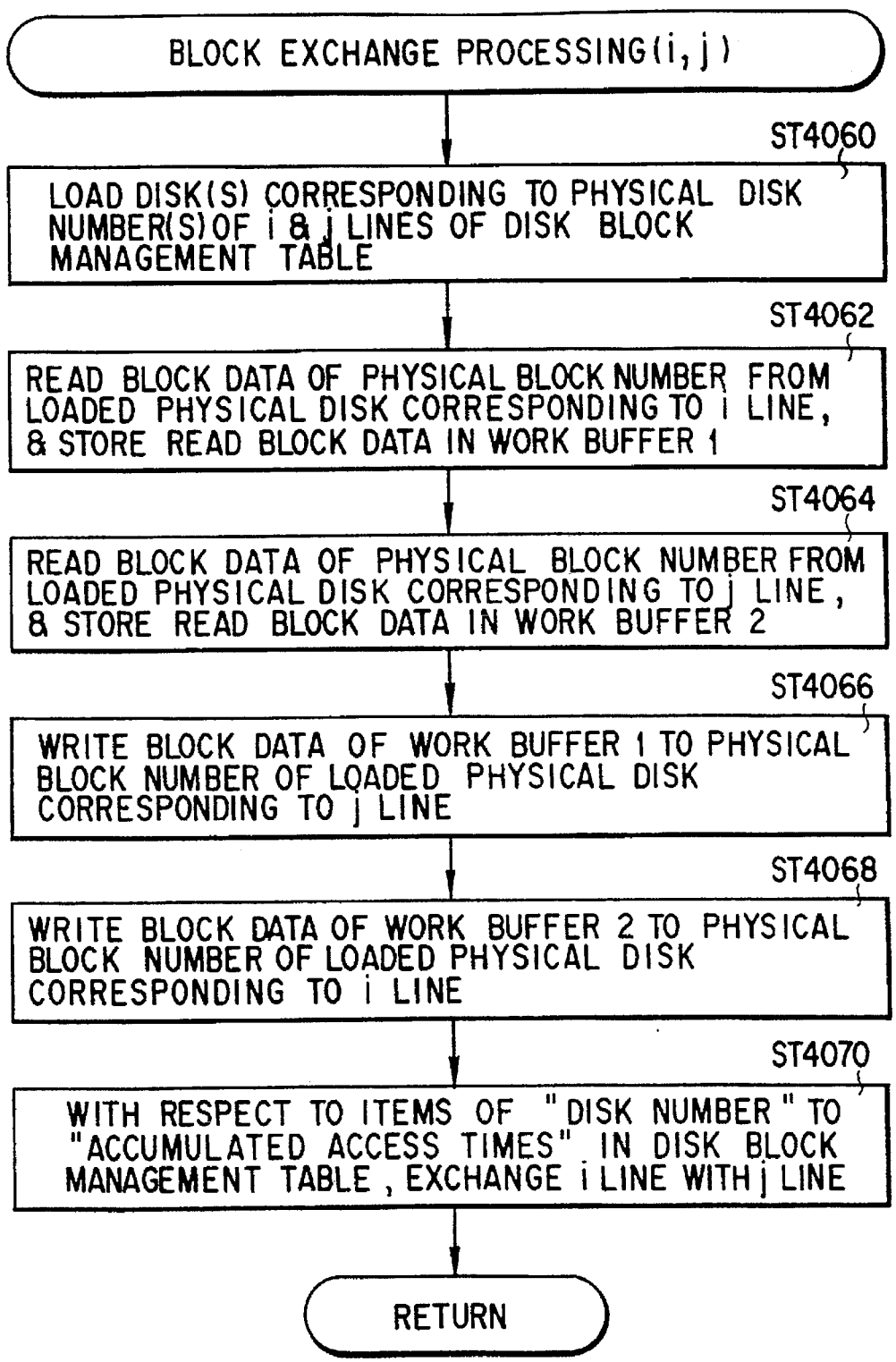
F I G. 21

DISK BLOCK MANAGEMENT TABLE (BEFORE GROUP RECONSTRUCTION PROCESSING)

| DISK NUMBER | BLOCK NUMBER | CELL NUMBER | ACCESS TIMES | ACCUMULATED ACCESS TIMES | PHYSICAL DISK NUMBER | PHYSICAL BLOCK NUMBER |
|---|---|---|---|---|---|---|
| 1 | 1 | 1 | 9 | 0 | 1 | 1 |
| 1 | 2 | 1 | 10 | 0 | 1 | 2 |
| 1 | 3 | 1 | 5 | 0 | 1 | 3 |
| --- | --- | --- | --- | --- | --- | --- |
| 1 | 1000 | 1 | 7 | 0 | 1 | 1000 |
| 2 | 1 | 2 | 50 | 0 | 2 | 1 |
| --- | --- | --- | --- | --- | --- | --- |
| 9 | 1 | 9 | 20 | 0 | 9 | 1 |
| --- | --- | --- | --- | --- | --- | --- |
| 9 | 1000 | 9 | 15 | 0 | 9 | 1000 |

F I G. 22

DISK BLOCK MANAGEMENT TABLE (AFTER GROUP RECONSTRUCTION PROCESSING)

| DISK NUMBER | BLOCK NUMBER | CELL NUMBER | ACCESS TIMES | ACCUMULATED ACCESS TIMES | PHYSICAL DISK NUMBER | PHYSICAL BLOCK NUMBER |
|---|---|---|---|---|---|---|
| 2 | 1 | 2 | 0 | 50 | 1 | 1 |
| 9 | 1 | 9 | 0 | 20 | 1 | 2 |
| 9 | 1000 | 9 | 0 | 15 | 1 | 3 |
| 1 | 2 | 1 | 0 | 10 | 1 | 4 |
| 1 | 1000 | 1 | 0 | 9 | 1 | 5 |
| 1 | 3 | 1 | 0 | 7 | 1 | 6 |
| 1 | — | — | 0 | 5 | 1 | 7 |
| — | — | — | — | — | — | — |
| — | — | — | — | — | — | — |
| — | — | — | — | — | 9 | 1000 |

FIG. 23

DATA STORAGE APPARATUS HAVING DATA AND PARITY MEDIA

BACKGROUND OF THE INVENTION

1. Field of the Invention

The present invention relates to a disk array apparatus having parity disks and, more particularly, to an optical disk array apparatus using a plurality of optical disks as information recording media.

2. Description of the Related Art

In recent years, the amount of data managed in an office have increased. In order to manage a large amount of data, various electronic filing systems using an optical disk array apparatus have been proposed.

This optical disk array apparatus is constituted by a plurality of optical disk drives, cells for housing a plurality of optical disks, and an accessor for moving the optical disks between the optical disk drives and the cells.

In order to manage a large amount of data with high reliability at high speed, it is desirable that data to be stored in the disk array apparatus should have a certain level of redundancy and should be distributed and stored in a plurality of disks in units of blocks.

For example, in a RAID (Redundant Array of Inexpensive Disks) constituted by N disks, parity data corresponding to data at the same block number in the first to (N−1)th data disks are stored at the same block number in the Nth parity disk. A set of these N disks including the data disks and the parity disk is called a group.

When consecutive data are to be read out from the above group, the respective data disks in which the corresponding blocks are stored can be simultaneously accessed. This allows a high-speed read operation.

If an error occurs in one data disk in a read operation, recovery from the error can be made by using identical block data in the remaining (N−1) data disks in the group to that in the disk in error. Therefore, high reliability can be ensured.

For instance, assume that A, B, C, and D are block data in specific blocks, respectively, and parity data D is determined to establish the following equation:

$$A \text{ xor } B \text{ xor } C = D \quad (1)$$

where xor indicates an exclusive-OR operation. That is, xor is a symbol for defining a logical operation like the one shown in FIG. 3.

Assume that data disk 1 has failed, and an error has occurred in a data read operation with respect to block A of disk 1. In this case, block data A can be recovered by performing the following operation:

$$B \text{ xor } C \text{ xor } D = A \quad (2)$$

As number N of disks constituting a group is decreased, the reliability is improved. However, if N=2, half of the total disk capacity is used for parity. That is, the proportion of the capacity, which can be actually used for data storage, to the total disk capacity is greatly reduced.

When a RAID system is constituted by an optical disk array apparatus, the greatest factors which determine an access speed are the number of times that optical disks are moved by an accessor and the moving distances. Therefore, the following considerations are important. Optical disks with high probabilities of access are preferentially left in optical disk drives. If this is not possible, such optical disks are housed in housing cells near optical disk drives.

Even with such considerations, if a read error occurs, it takes much time for recovery processing because data is recovered by accessing all the optical disks in the group except for the disk in which the error has occurred. Especially, as the number of times that optical disks required for recovery are loaded into optical disk drives increases, this processing time increases.

That is, the following trade-offs occur. As the number N of disks constituting a group increases, the total storage capacity increases, but recovery processing at the occurrence of an error is slowed down. In contrast to this, as the number N of disks constituting a group decreases, recovery processing at the occurrence of an error is speeded up, but the total storage capacity which can be actually used for data storage is reduced.

number N of disks in group small→large number of disks required for recovery processing small→large total storage capacity of group small→large reliability high→low

SUMMARY OF THE INVENTION

It is an object of the present invention to provide a disk array apparatus which can realize high-speed recovery processing at the occurrence of an error while minimizing a substantial reduction in total storage capacity due to the presence of a parity disk.

To achieve the above object, a disk array apparatus using a plurality of disks comprises:

a plurality of disk drives each for data access from each of the disks;

a counting member for counting number of times of data access with respect to each of the disks, where the data access is performed by any of the disk drives;

a disk management table for managing the number of times of the data access obtained by the counting member with respect to each of the disks;

a group management table for managing one or more media groups each containing a plurality of the disks, where the disks of each of the media groups include one or more data disks each for storing data of an information body and one or more parity disks each for storing parity data to be used for recovering the data stored in the data disks; and a device for assigning the disks, having data to be accessed by the disk drives, to one of the media groups managed by the group management table, in accordance with the number of times of the data access managed by the disk management table.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2C are views respectively showing a group management table, a disk management table, and a drive management table which are used in the disk array apparatus in FIG. 1;

FIG. 4 is a flow chart for explaining the contents of read processing in FIG. 3;

FIG. 7 is a flow chart for explaining the second half of the contents of the recovery processing in FIG. 4;

FIG. 12 is a flow chart for explaining the last portion of the contents of the group reconstruction processing in FIG. 3;

FIGS. 13A and 13B are views showing other drive management tables used in the disk array apparatus in FIG. 1;

FIGS. 14A and 14B are views respectively showing another group management table and another disk management table used in the disk array apparatus in FIG. 1;

FIGS. 15A to 15C are views respectively showing another group management table, another disk management table, and another drive management table used in the disk array apparatus in FIG. 1;

FIGS. 16A and 16B are views respectively showing another group management table and another disk management table used in the disk array apparatus in FIG. 1;

FIG. 18 is a table indicating the numbers of disk loading times in a disk array apparatus to which the present invention is not applied;

FIG. 19 is a table indicating the numbers of disk loading times in the disk array apparatus according to the embodiment of the present invention;

FIG. 20 is a flow chart for explaining a case wherein the group reconstruction processing in FIG. 3 is performed in units of blocks of each disk;

FIG. 21 is a flow chart for explaining block exchange processing in FIG. 20;

FIG. 22 is a disk block management table before the group reconstruction processing in units of blocks in FIG. 20; and FIG. 23 is a disk block management table after the group reconstruction processing in units of blocks in FIG. 20.

DETAILED DESCRIPTION OF THE PREFERRED EMBODIMENT

Figure 1:
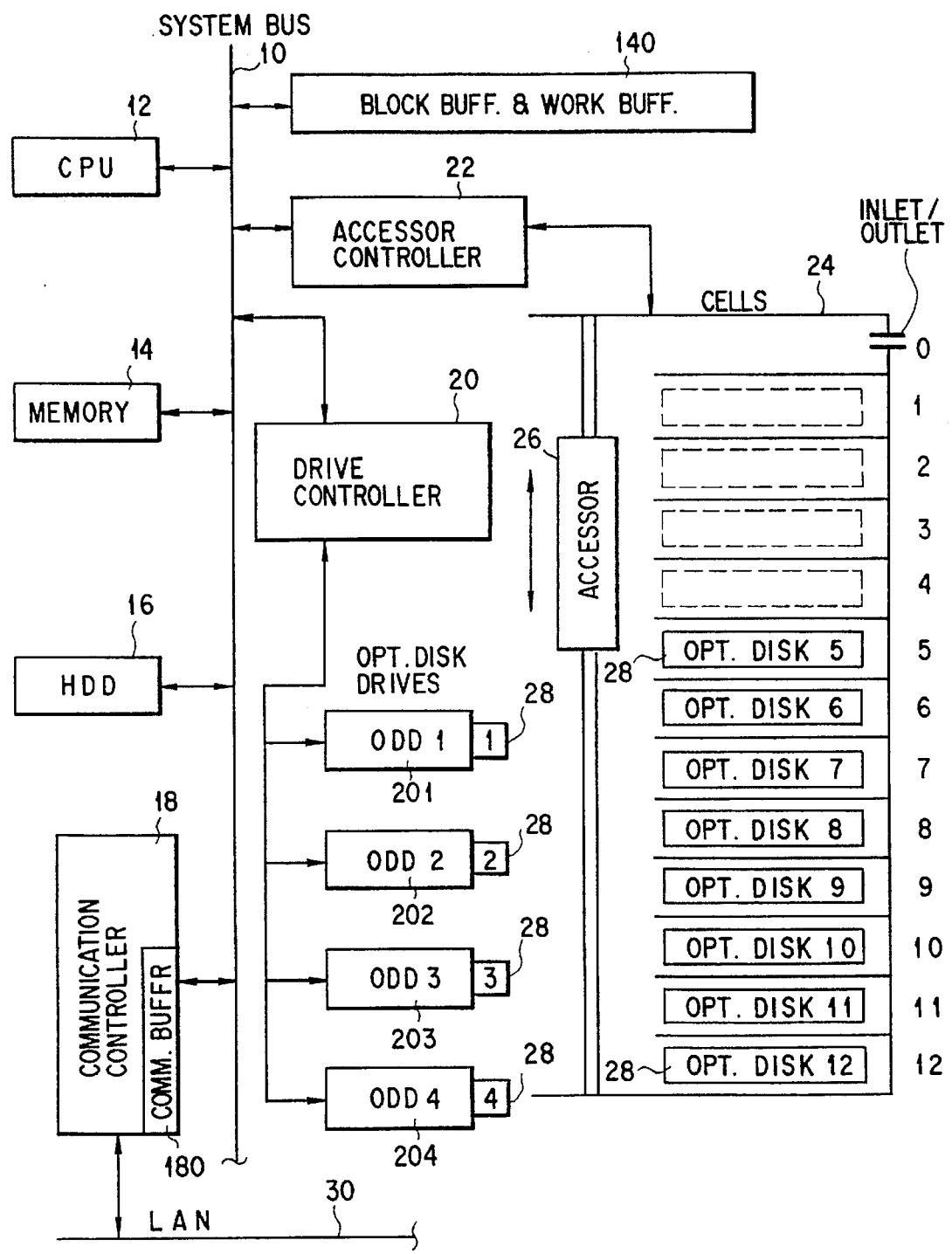
FIG. 1 is a block diagram showing the arrangement of a disk array apparatus according to an embodiment of the present invention.

FIG. 1 is a block diagram showing the arrangement of a disk array apparatus according to an embodiment of the present invention.

Referring to FIG. 1, the following components are connected to system bus 10: CPU 12 for controlling the overall operation of the apparatus; memory 14 for storing software (various programs) to be executed by CPU 12 and data used therefor as needed; HDD 16 for storing this software and information about various management tables (to be described later); communication controller 18 for performing data communication with external devices (not shown), e.g., a host computer, via communication line 30 of a local area network (LAN); and buffers (block and work buffers) 140 for temporarily storing various data (e.g., data read from an optical disk and data to be written in an optical disk) accompanying the operation of the apparatus of this embodiment.

In this case, buffers 140 include a plurality of buffers (a block buffer, a work buffer, and the like), and part of memory 14 can be used as buffers 140. Communication controller 18 has its own buffer 180.

When communication controller 18 receives a command sent from an external device via communication line 30, CPU 12 executes the command. The result obtained by executing the command is sent from communication controller 18 to the external device, which has sent the command, via communication line 30, as needed.

In addition, drive controller 20 and accessor controller 22 are connected to system bus 10. Drive controller 20 can simultaneously control four optical disk drives 201 to 204. Accessor controller 22 performs control to load (automatic loading) optical disks 28 in optical disk drives 201 to 204.

CPU 12 loads a predetermined program from HDD 16 into memory 14, and controls the respective components shown in FIG. 1 in accordance with the contents of the program.

For example, information read and write operations with respect to optical disks 28 loaded into optical disk drives 201 to 204 are controlled by drive controller 20 on the basis of commands from CPU 12.

Accessor controller 22 controls accessor 26 arranged at cell section 24 capable of housing 12 optical disks 28. Assume that a program running on CPU 12 issues a command to load optical disk 28 of disk number "1" into optical disk drive 201. In this case, upon reception of this command, accessor controller 22 drives accessor 26 to take out optical disk 28 of disk number "1" via the inlet/outlet of slot 0 and load it into optical disk drive 201.

Similarly, accessor controller 22 drives accessor 26 to take out predetermined optical disk 28 from a predetermined optical disk drive (one of optical disk drives 201 to 204) and return it into an empty housing portion (cell) in cell section 24. That is, accessor 26 controlled by accessor controller 22 serves to move (automatic change) a disk between each housing portion of cell section 24 and a corresponding one of four optical disk drives 201 to 204.

When an external device (not shown) connected to the apparatus via communication line 30 transmits a command to read out data from a given block of specific optical disk 28, CPU 12 performs the following operation.

Accessor controller 22 is controlled such that optical disk 28 specified by the command is taken out from cell section 24 and loaded into a specific optical disk drive (one of optical disk drives 201 to 204). (If specific optical disk 28 has already been loaded into one of optical disk drives 201 to 204, this access control is skipped. If optical disks have already been loaded in all four optical disk drives 201 to 204, an unnecessary optical disk is taken out from the corresponding optical disk drive and returned into cell section 24, and access control is then performed to load specific optical disk 28 into the empty optical disk drive.)

Subsequently, drive controller 20 reads out the data of the block specified by the command from the optical disk drive into which this optical disk is loaded. The readout data is supplied to a communication buffer (not shown) in communication controller 18 via system bus 10. The contents of this communication buffer (the data in the predetermined block of the predetermined optical disk) are sent to the external device which has issued the command.

FIGS. 2A to 2C show the contents of a group management table, a disk management table, and a drive management table used in the disk array apparatus shown in FIG. 1. These contents exemplify the data set at the time of the initial operation of the disk array apparatus shown in FIG. 1.

The disk array apparatus shown in FIG. 1 is constituted by a total of 12 optical disks 28. Disk numbers "1" to "12" are assigned to respective optical disks 28. Respective optical disks 28 can be specified by these disk numbers.

Cell section 24 for housing optical disks 28 is constituted by a slot having cell number "0" which serves as a window through which disks are taken in and out, and cells having cell numbers "1" to "12" for housing 12 optical disks 28, respectively.

There are four optical disk drives 201 to 204, to which drive numbers "1" to "4" are respectively assigned.

FIG. 2A shows a specific disk group to which each of optical disks 28 (disk numbers "1" to "12) belongs. In this case, optical disks 28 of disk numbers "1" to "12" are classified into three groups 1 to 3. The number of disks constituting group 1 is two. The number of disks constituting group 2 is four. The number of disks constituting group 3 is six.

In group 1 constituted by two disks, optical disk 28 of disk number "1" is assigned for data, and optical disk 28 of disk number "10" is assigned for parity.

In group 2 constituted by four disks, optical disks 28 of disk numbers "2", "3", and "4" are assigned for data, and optical disk 28 of disk number "11" is assigned for parity.

In group 3 constituted by six disks, optical disks 28 of disk numbers "5" to "9" are assigned for data, and optical disk 28 of disk number "12" is assigned for parity.

The disk management table in FIG. 2B shows the correspondence between optical disks 28 of disk numbers "1" to "12" and cell numbers "1" to "12" of cell section 24 in which the optical disks are housed (at the time of the initial operation of the apparatus), together with the number of access times and total number of access times of optical disks 28 of disk numbers "1" to "12". In this case, since the apparatus is in the initial operation period, the number of access times and total number of access times of the respective disks are all set to be 0.

The drive management table in FIG. 2C shows the correspondence between four optical disk drives 201 to 204 and four optical disks 28 (e.g., disk numbers "1" to "4") respectively loaded thereinto (at the time of the initial operation of the apparatus), together with the number of access times of optical disks 28 respectively loaded into the disk drives of drive numbers "1" to "4". In this case, since the apparatus is in the initial operation period, the numbers of access times of all optical disk drives 201 to 204 are set to be 0.

Note that the group management table in FIG. 2A, the disk management table in FIG. 2B, and the drive management table in FIG. 2C are stored in HDD 16.

Figure 3:
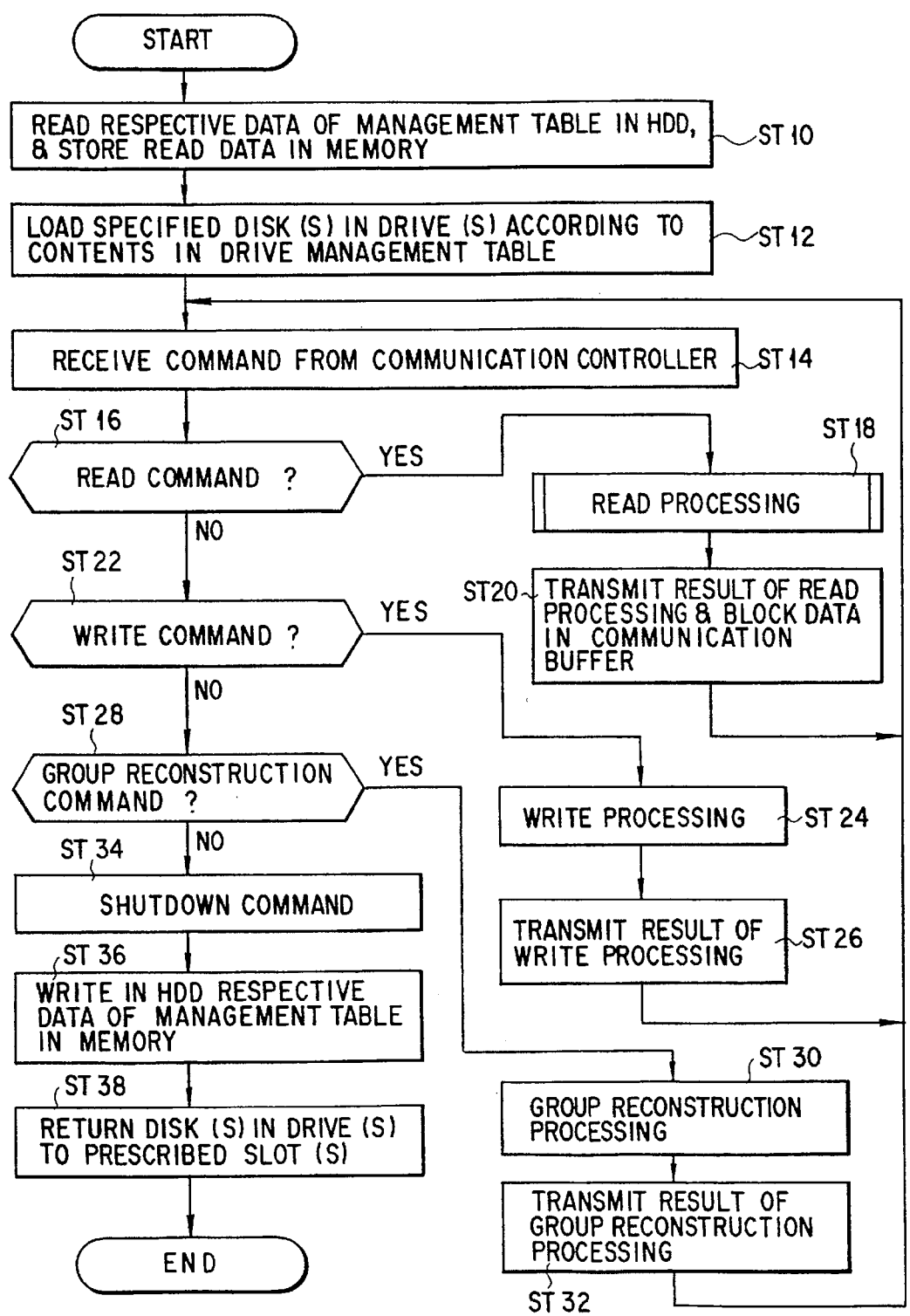
FIG. 3 is a flow chart for explaining the overall operation of the disk array apparatus in FIG. 1.

FIG. 3 is a flow chart for explaining the overall operation of the disk array apparatus in FIG. 1.

First, the respective data in the group management table (FIG. 2A), the disk management table (FIG. 2B), and the drive management table (FIG. 2C) stored in HDD 16 are read out and stored in memory 14 (step ST10).

A cell number at which an optical disk indicated by a disk number set in the drive management table is then obtained from the disk management table. The optical disk is taken out from the cell number and loaded into an optical disk drive indicated by a drive number set in the drive management table (step ST12).

Assume that a command is subsequently sent from an external device (host computer) (not shown) via communication line 30. In this case, when communication controller 18 receives this command (step ST14), CPU 12 decodes the command (step ST16).

If the received command is a read command (YES in step ST16), predetermined read processing is performed (step ST18). With this processing, data read out from a specific block of specific optical disk 28 is written in the communication buffer (not shown) in communication controller 18. Thereafter, the result of the read processing (data indicating the presence/absence of a read error, a notification of the completion of the read processing, and the like) and the block data in the communication buffer are transmitted to the external device, which has issued the read command, via communication line 30 (step ST20).

If the received command is not a read command (NO in step ST16) but a write command (YES in step ST22), predetermined write processing is performed (step ST24). With this processing, data transmitted from the external device to the communication buffer (not shown) in communication controller 18 is written in a predetermined block of specific optical disk 28. Thereafter, the result of the write processing (data indicating the presence/absence of a write error, a notification of the completion of the write processing, and the like) is transmitted to the external device, which has issued the write command, via communication line 30 (step ST26).

If the received command is neither a read command nor a write command (NO in step ST16; NO in step ST22) but is a group reconstruction command (YES in step ST28), predetermined group reconstruction processing is performed (step ST30). With this processing, the combinations of the disk numbers of the disks constituting disk groups 1 to 3 are changed. In addition, the contents of the parity disks of the respective groups are updated in accordance with this change in combination. Thereafter, the result of the group reconstruction processing (the contents of the group management table after the change in combination, a notification of the completion of the group reconstruction processing, and the like) is transmitted to the external device, which has issued the group reconstruction command, via communication line 30 (step ST32).

If the received command is neither of the aforementioned commands, i.e., a read command, a write command, and a group reconstruction command (NO in step ST16; NO in step ST22; NO in step ST28), this command is recognized as a shutdown command (step ST34). When this shutdown command is executed, the contents of the group management table, the disk management table, and the drive management table in memory 14 are written in HDD 16 (step ST36). Thereafter, optical disks 28 loaded into optical disk drives 201 to 204 are sequentially taken out and returned to predetermined empty cells of cell section 24 (step ST38).

FIG. 4 is a flow chart for explaining the contents of the read processing in FIG. 3. When a read command is received in step ST14 in FIG. 3, the disk number of optical disk 28 from which data is to be read out, a data block number at which the data to be read is stored, and a block buffer (e.g., block buffer 1) in which the read block data is to be stored are designed by this command.

More specifically, when block buffer 1 and a data disk number (e.g., "1") are specified by the read command (step ST180), optical disk 28 of disk number "1" is loaded into an empty drive (one of optical disk drives 201 to 204) by accessor 26 (this load processing is skipped if the disk of number "1" has already been loaded into one of the drives).

When predetermined optical disk 28 (disk number "1") is loaded into, for example, optical disk drive 201 of drive number "1", data is read from a block number (e.g., block number "1000") specified by the read command and is stored in specified block buffer 1 (step ST182).

If this data read processing is successfully completed (YES in step ST184), "1" is added to the column "access times" corresponding to disk number "1" (of the disk from which the data is read out) in the disk management table in FIG. 2B (step ST186). Subsequently, "1" is added to the column "access times" corresponding to drive number "1" (of the drive from which the data is read out) in the drive management table in FIG. 2C (step ST188).

If an error occurs in a data read operation with respect to a specific block number ("1000") of optical disk 28 of disk number "1" (NO in step ST184), the data in the block ("1000") in which the error has occurred is recovered (step ST190).

If this recovery processing fails (for example, an error also occurs at block number "1000" of parity disk 10) (NO in step ST192), the program comes to an "error" end. If this recovery processing is successfully completed (YES in step ST192), the contents of block buffer 1 are the data from the specific block number ("1000") of optical disk 28 of disk number "1".

Figure 5:
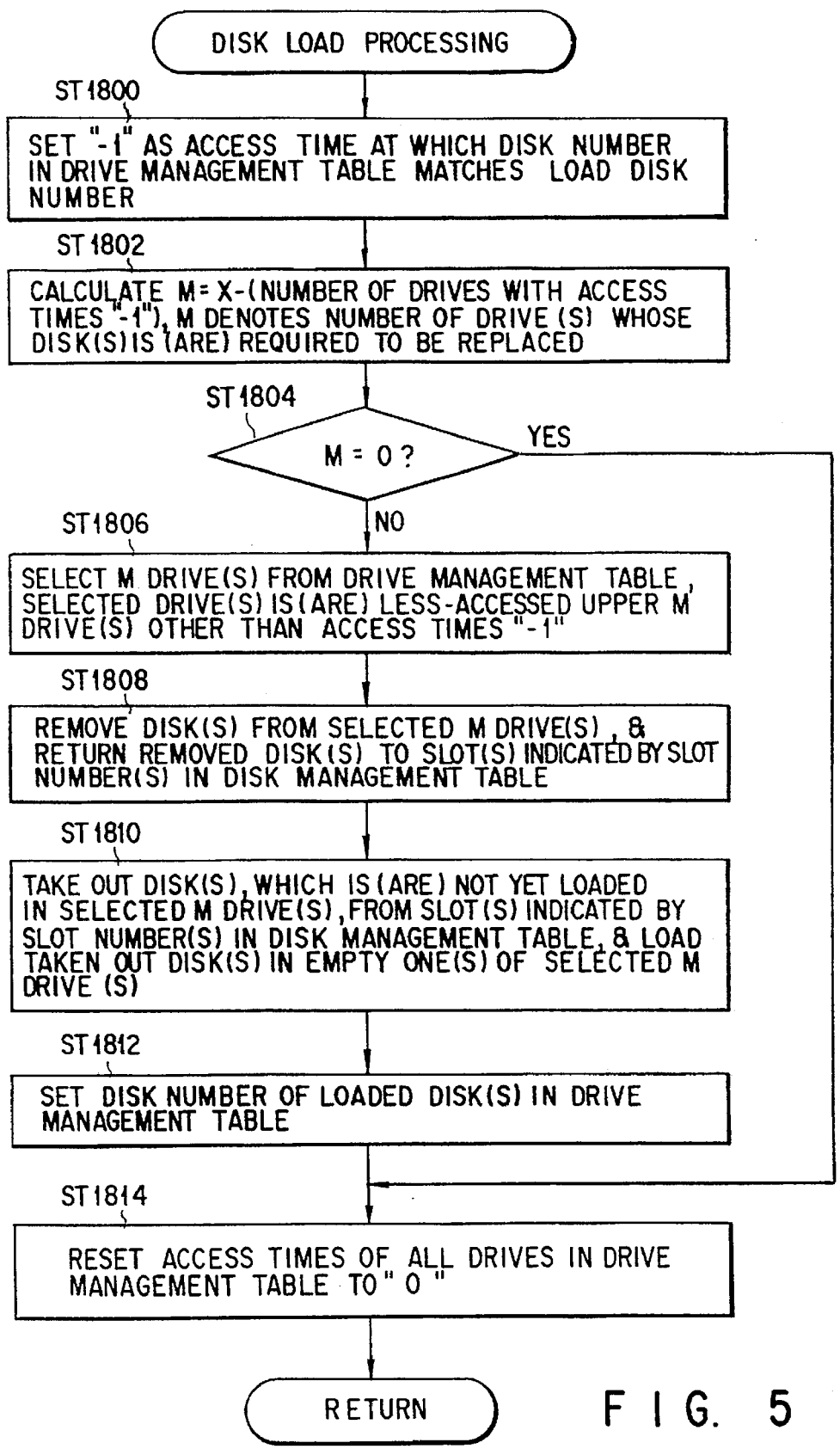
FIG. 5 is a flow chart for explaining the contents of disk load processing.
Figures 12, 13A:
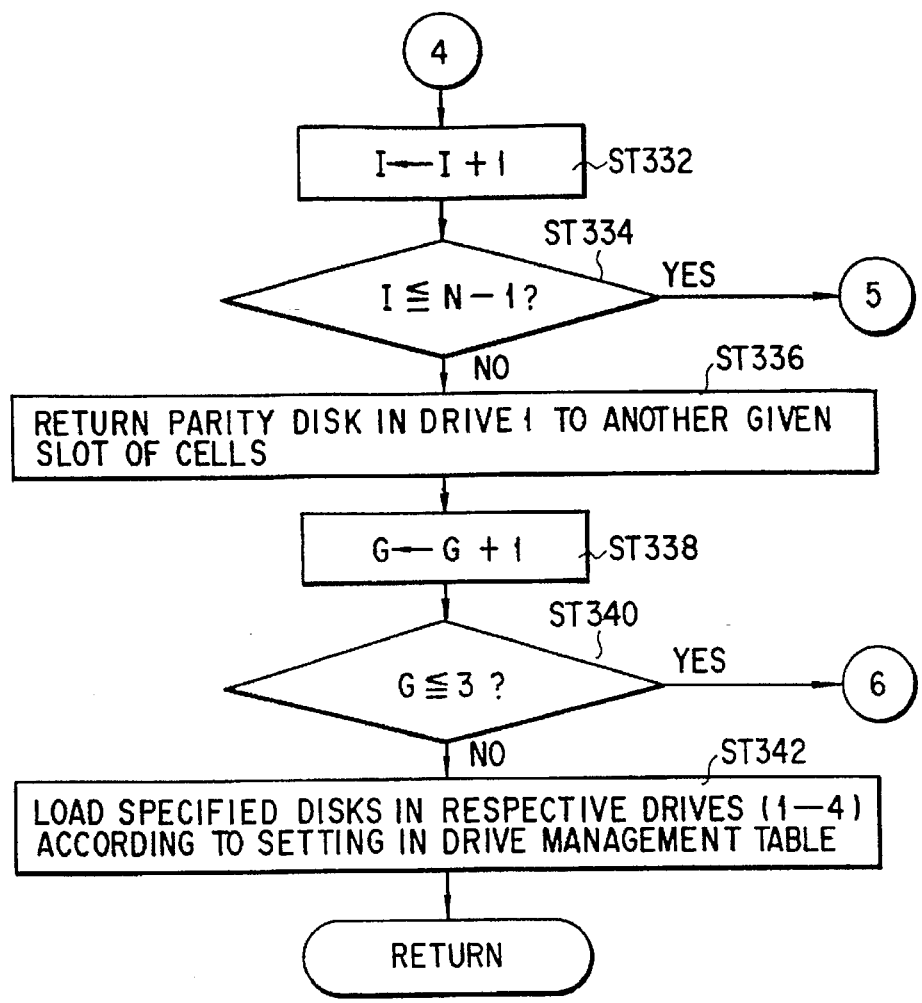

FIG. 5 is a flow chart for explaining the contents of disk load processing. FIG. 13A shows the drive management table before the disk load processing. FIG. 13B shows the drive management table after the disk load processing.

Disk load processing is performed when specified optical disk 28 is loaded in none of four optical disk drives 201 to 204. In this processing, for example, the numbers of access times recorded in the drive management table shown in FIG. 13A are checked, and optical disk drive 204 of drive number "4" with the minimum number of access times is selected.

A drive with the minimum number of access times is selected as the one to be replaced, but a drive which was frequently accessed in the past is not selected for the following reason. The possibility of frequently accessing the drive which was frequently accessed in the past is high. Replacement of the disk in such a drive increases the necessity of subsequent time-consuming disk replacement. If the drive with the minimum number of access times is selected as the one to be replaced, the number of times of subsequent disk replacement can be decreased.

Assume that the number of optical disks which need to be replaced (loaded) is one (x−1), and the optical disk of disk number "7" specified as one (x) disk to be loaded.

First, it is checked by referring to the drive management table (FIG. 13A) whether optical disk 28 of disk number "7", which is specified as the one to be loaded, has already been loaded into one of optical disk drives 201 to 204 of drive numbers "1" to "4". If optical disk 28 of disk number "7" has already been loaded into one of the optical disk drives of drive numbers "1" to "4", "−1" is set in the column "access times" corresponding to the drive number of the drive in which the optical disk of disk number "7" has already been loaded (step ST1800). In this case, however, since the optical disk of disk number "7" is not loaded in the drive of any drive number, "−1" is set nowhere in the drive management table in FIG. 13A.

Subsequently, number M of optical disks to be actually loaded is obtained. More specifically, the number of drives corresponding to the column "access times" in which "−1" is set is subtracted from number x (=1) of optical disks to be loaded (step ST1802).

In the above case, since x is one, and the number of drives corresponding to the column "access times" in which "−1" is set is zero, M=x−(the number of drives corresponding to "−1")=1. In this case, M is not zero (NO in step ST1804).

Of drives other than drives corresponding to "−1" as "access times", M drives (one drive of drive number "4" in the case shown in FIG. 13A) with smaller numbers of access times are selected from the drive management table (step ST1806).

Optical disk 28 of disk number "4" is removed from the M drives (one drive in the case shown in FIG. 13A) selected in this manner, i.e., optical disk drive 204 of drive number "4" (which was accessed at a relatively low frequency in the past). The removed disk is returned to slot (cell) 4 indicated by a slot number (cell number) in the disk management table (FIG. 2B) (step ST1808).

Optical disk 28 of disk number "7", which is not loaded into the selected M (one) drive (drive number "4"), is taken out from the slot (cell) indicated by slot number (cell number) "7" in the disk management table (FIG. 2B), and is loaded into drive 204 of drive number "4" (step ST1810).

When the optical disk (disk number "4") with a low access frequency, which has been loaded into drive 204 of drive number "4", is replaced with optical disk 28 of disk number "7" in this manner, disk number "7" of the newly loaded drive is written in the column corresponding to drive number "4" in the drive management table, as shown in FIG. 13B (step ST1812). Thereafter, all the values in "access times" corresponding to drive numbers "1" to "4" are reset to "0" (step ST1814).

Figure 6:
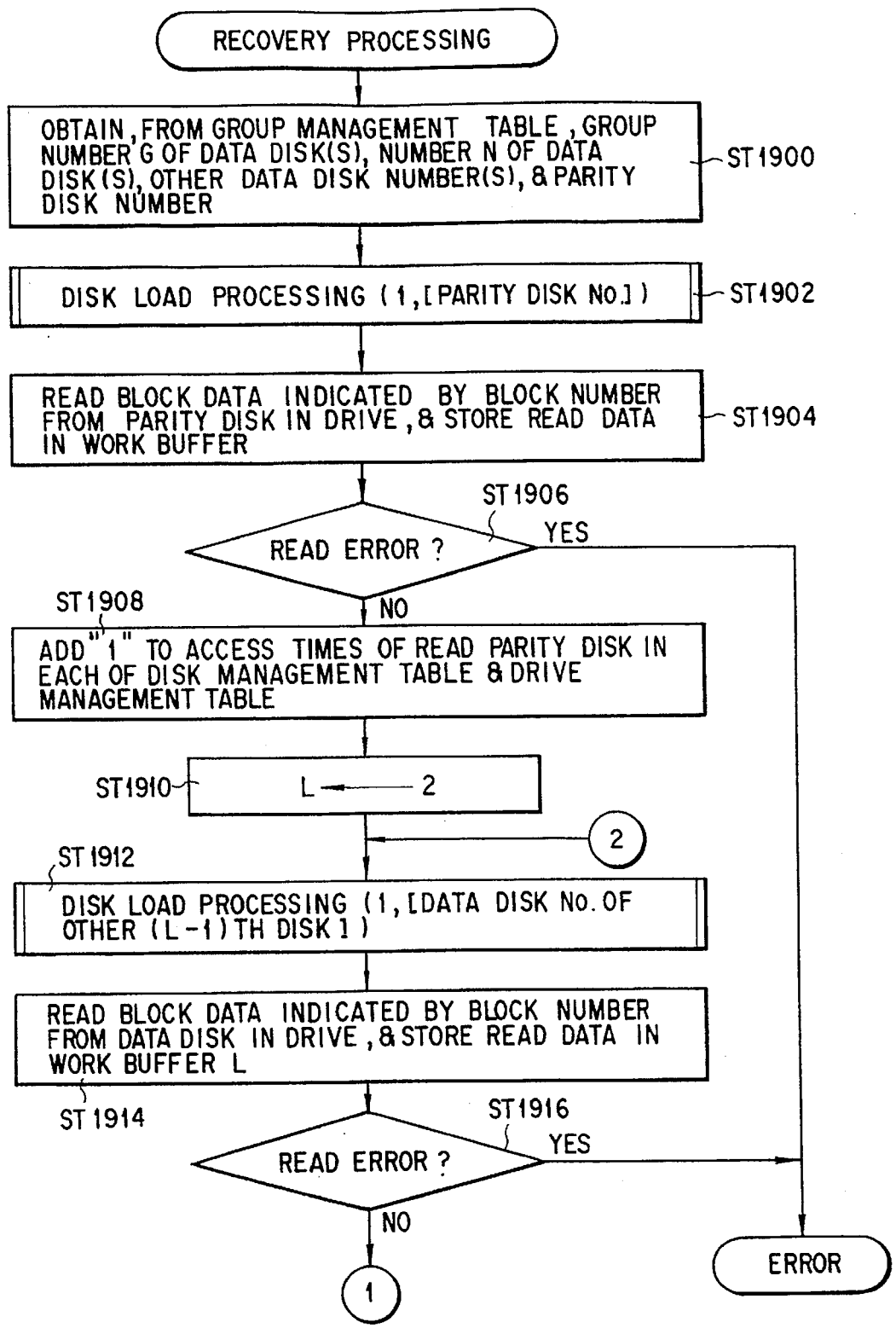
FIG. 6 is a flow chart for explaining the first half of the contents of recovery processing in FIG. 4.

FIGS. 6 and 7 are flow charts for explaining the contents of the reconstruction processing in FIG. 4.

When recovery processing is to be performed, the disk number (one of "1" to "12") of optical disk 28 to be used for the recovery processing, the block number of optical disk 28 in which data used for the recovery processing is stored, and a block buffer for storing recovered block data are specified first.

Assume that an error has occurred in optical disk 28 of disk number "3" in FIG. 2A. In this case, optical disks 28 of disk numbers "2", "4", and "11" are used for the recovery processing. If the error has occurred at block number "1000" of optical disk 28 of disk number "3", the block number of each optical disk 28 at which data used for the recovery processing is stored is also "1000". If block buffers 1 to 3 are prepared for the respective groups, block buffer 2 is specified as a buffer memory used for the error recovery processing with respect to disk number "3" of group 2.

Upon completion of the above specification, group number G (=2) to which optical disk 28 (disk number "3") subjected to error recovery belongs, number N (=4) of disks constituting group G, and the disk numbers ("2", "4", and "11") of optical disks 28 used for the recovery processing are read out from the group management table shown in FIG. 2A (step ST1900). (Load processing of (N−1) optical disks used for the recovery processing can be performed on the basis of the result of this read processing.)

In the subsequent disk load processing, work buffer 1 and a parity disk number ("11") are specified (step ST1902). Optical disk 28 of disk number "11" is then loaded into an empty drive (one of drives 201 to 204) by accessor 26 (if optical disk 28 of disk number "11" has already been loaded into one of the drives, this load processing is skipped).

This disk load processing is performed in the same manner as in the processing shown in FIG. 5. More specifically, if one of optical disk drives 201 to 204 is empty, optical disk 28 of disk number "2" is loaded into the empty drive. If there is no empty drive, optical disk 28 is taken out from one of drives 201 to 204 (drive numbers "1" to "4") which was accessed at a low frequency in the past, e.g., the drive of drive number "4" (see FIG. 13A). Optical disk 28 of disk number "11" is then loaded into the drive of drive number "4". Thereafter, all the values of "access times" in the drive management table are reset to "0" (see FIG. 13B).

When optical disk 28 (parity disk) of disk number "11" is loaded into drive 204 of drive number "4", block data is read from block number "1000" at which the error has occurred. The read block data is then stored in specified work buffer 1 (buffer number L=1) (step ST1904).

If an error occurs in a data read operation with respect to block number "1000" of optical disk 28 of disk number "11" (YES in step ST1906), an error is determined, and the recovery processing is terminated.

If this data read operation is properly completed (NO in step ST1906), "1" is added to the column "access times" corresponding to drive number "4"/disk number "11", at which the read operation has been performed, in the disk management table in FIG. 2B. In addition, "1" is added to the column "access times" corresponding to drive number "4", at which the read operation has been performed, in the drive management table in FIG. 2C (in this case the disk number "11" is different from that in the table of FIG. 2C) (step ST1908).

Subsequently, load processing of remaining (N−2) optical disks 28 used for the recovery processing is performed.

To being with, work buffer 2 is specified as buffer L for temporarily storing block data for recovery (step ST1910). Thereafter, load processing of optical disk 28 of disk number "2" is performed on the basis of a disk number list read out in step ST1900 (step ST1912).

This disk load processing is performed in the same manner as that shown in FIG. 5. More specifically, if one of optical disk drives 201 to 204 is empty, optical disk 28 of disk number "2" is loaded into the empty drive. If there is no empty drive, optical disk 28 is taken out from one of drives 201 to 204 (drive numbers "1" to "4") which was accessed at a low frequency in the past, e.g., the drive of drive number "1" (see FIG. 13B; the value of "access times" corresponding to drive number "4" has been set to "1" in step ST1908). Optical disk 28 of disk number "2" is loaded into the drive of driven number "1".

When optical disk 28 of disk number "2" is loaded into optical disk drive 201 (drive number "1") in this manner, block data is read out from block number "1000" of optical disk 28 of disk number "2", and the read block data is stored in work buffer 2 (L=2) (step ST1914).

When an error occurs in a data read operation with respect to block number "1000" of optical disk 28 of disk number "2" (YES in step ST1916), an error is determined, and the recovery processing is terminated.

If this data read operation is properly completed (NO in step ST1916), "1" is added to the column "access times" corresponding to disk number "1"/disk number "2", at which the read operation has been performed, in the disk management table shown in FIG. 2B. In addition, "1" is added to the Column "access times" corresponding to drive number "1", at which the read operation has been performed, in the driven management table in FIG. 2C (in this case the correspondence between the drive number and the disk number is different from that in the table of FIG. 2C) (step ST1918).

In this case, since number N of disks corresponding to group number G (=2) is four, and buffer number parameter L is two, L (=2)<N−1 (=3) (YES in step ST1920). In this case, parameter L is incremented by one (step ST1922), and disk load processing is performed with respect to optical disk 28 of disk number "4" by using work buffer 3 (=L) (step ST1912).

This disk load processing is also performed in the same manner as that shown in FIG. 5. More specifically, if one of optical disk drives 201 to 204 is empty, optical disk 28 of disk number "4" is loaded into the empty drive. If there is no empty drive, optical disk 28 is taken out from one of drives 201 to 204 (drive numbers "1" to "4") which was accessed at a low frequency in the past, e.g., the drive of drive number "2" (see FIG. 13B; the values of "access times" corresponding to drive numbers "1" and "4" have been set to "1" in steps ST1908 and ST1918, respectively). Optical disk 28 of disk number "4" is loaded into the drive of driven number "2".

When optical disk 28 of disk number "4" is loaded into optical disk drive 202 (drive number "2") in this manner, block data is read out from block number "1000" of optical disk 28 of disk number "4", and the readout block data is stored in work buffer 3 (L=3) (step ST1914).

If an error occurs in a data read operation with respect to block number "1000" of optical disk 28 of disk number "4" (YES in step ST1916), an error is determined, and the recovery processing is terminated.

If this data read operation is properly completed (NO in step ST1916), "1" is added to the column "access times" corresponding to drive number "2"/disk number "4", at which the read operation has been performed, in the disk management table shown in FIG. 2B. In addition, "1" is added to the column "access times" corresponding to drive number "2", at which the read operation has been performed, in the drive management table in FIG. 2C (in this case the correspondence between the driven number and the disk number is different from that in the table of FIG. 2C) (step ST1918).

Since buffer number parameter L has been incremented to "3" in step ST1922, L (=3)<N−1 (=3) is not satisfied (NO in step ST1920). In this case, work buffer 2 (=L) is specified first (step ST1942).

Consequently, L (=2)≦N—1 (=3) is satisfied (YES in step ST1926), and an xor operation is performed between the block data (the data read out from block number "1000" of parity disk 28 of disk number "11") in work buffer 1 and the block data (the data read out from block number "1000" of data disk 28 of disk number "2") in work buffer 2 (=L). The operation result is stored in work buffer 1 (step ST1928).

After this operation, parameter L is incremented by one (step ST1930). As a result, L (=3)≦N−1 (=3) (YES in step ST1926), and an xor operation is performed between the block data (the data read out from block number "1000" which has been subjected to the xor operation between the data corresponding to disk numbers "2" and "11") in work buffer 1 and the block data (the data read out from block number "1000" of data disk 28 of disk number "4") in work buffer 3 (=L). The operation result is stored in work buffer 1 (step ST1928).

After this operation, parameter L is incremented by one (step ST1930). As a result, L (=4)≦N−1 (=3) (NO in step ST1926), and the data read out from block number "1000" which has been subjected to the xor operation between the data corresponding to disk numbers "2", "4", and "11" is transferred from work buffer 1 to block buffer 2 (step ST1932). The contents of block buffer 2 are recovered block data corresponding to group 2/disk number "3"/block number "1000" at which the error has occurred.

If, for example, an error occurs in optical disk 28 of disk number "5" of group 3 in FIG. 2A, five disks (disk numbers "6", "7", "8", "9", and "12") are required for recovery processing. In this case, in the arrangement shown in FIG. 1, since there are only four optical disk drives, disk replacement must be performed with respect to at least one of the five disks. This disk replacement is performed in step ST1912 in FIG. 6 in the same manner as the disk load processing in FIG. 5. In this case, since the corresponding block data in the replaced disk is left in five work buffers L (L=1 to 5 in this case), no problem is posed in recovery processing.

Figure 8:
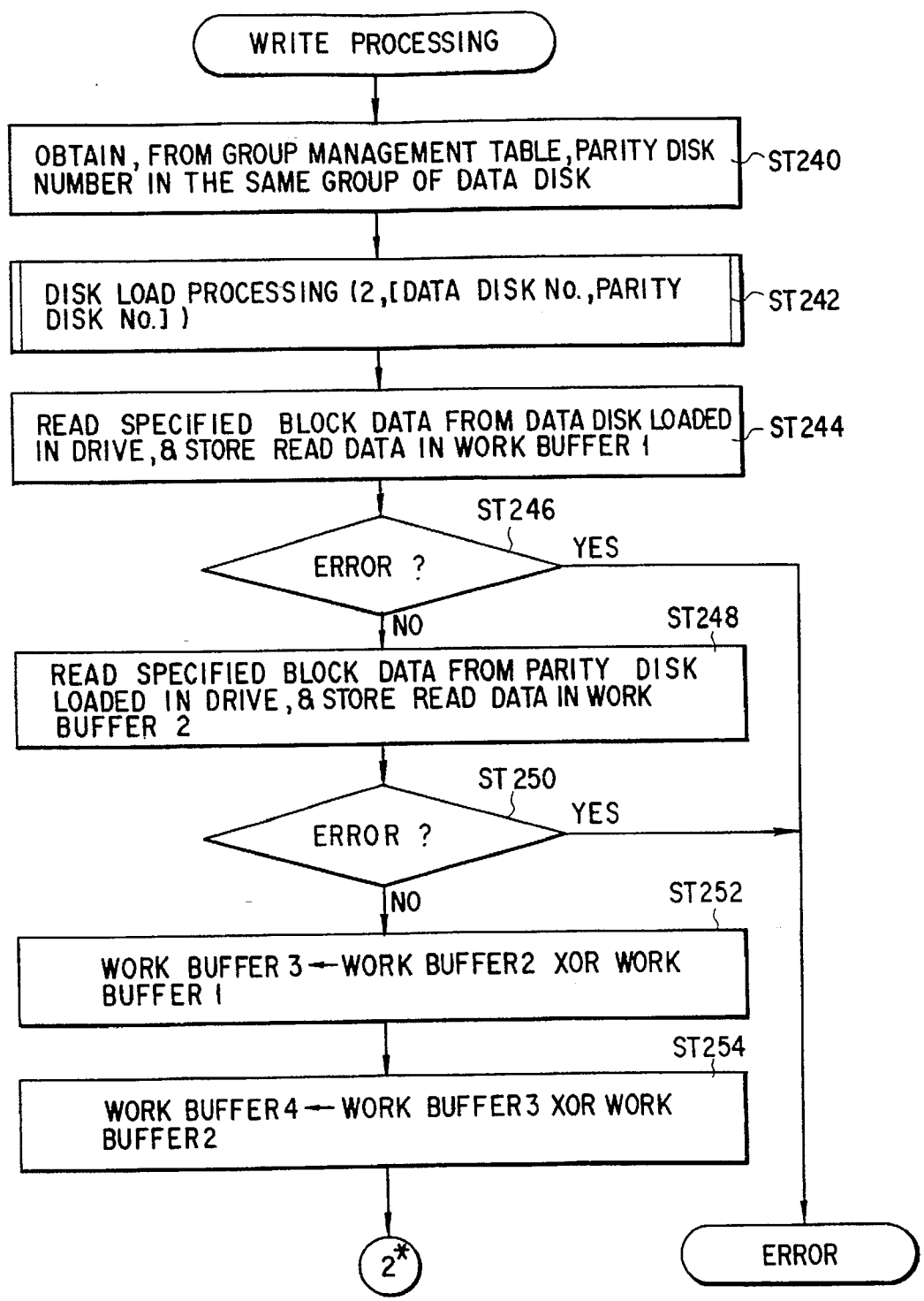
FIG. 8 is a flow chart for explaining the first half of the contents of write processing in FIG. 3.
Figure 9:
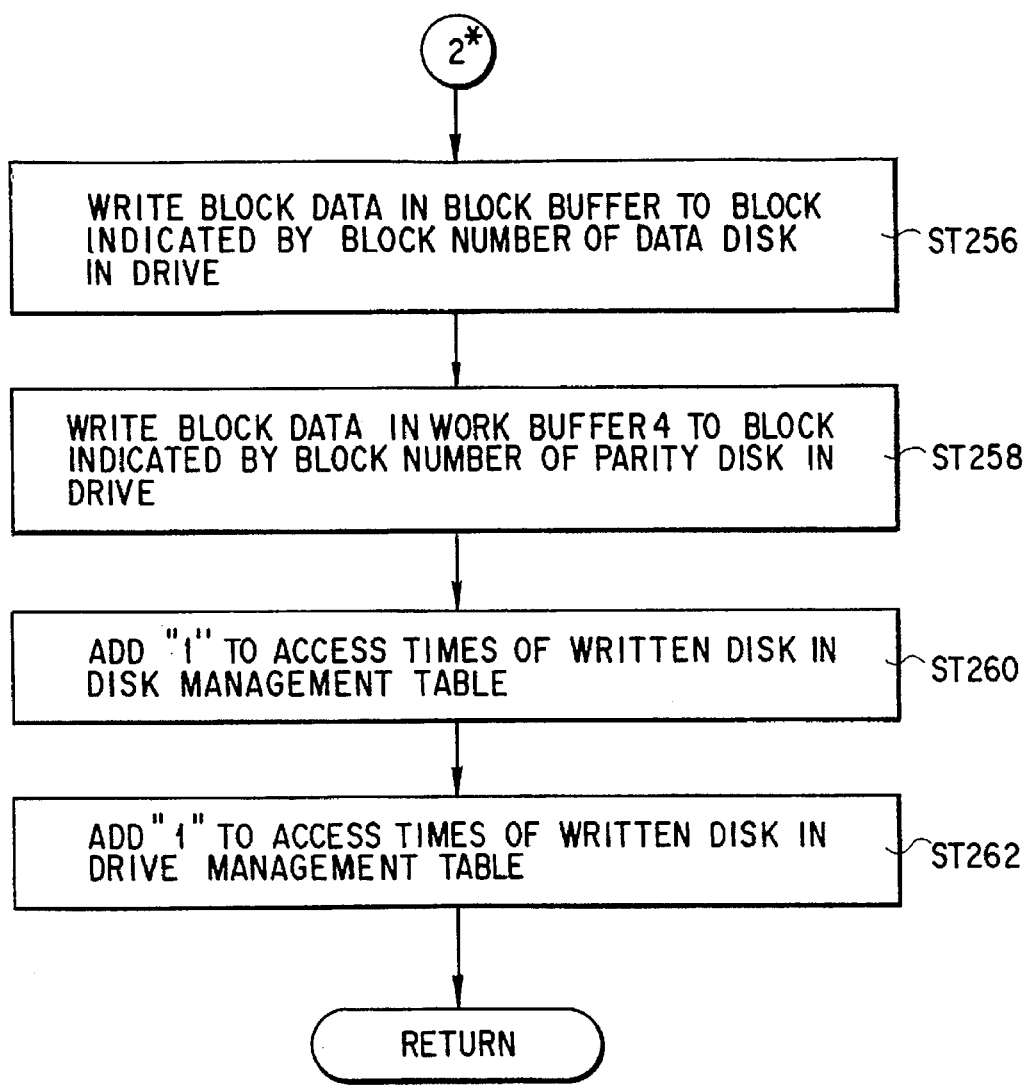
FIG. 9 is a flow chart for explaining the second half of the contents of the write processing in FIG. 3.

FIGS. 8 and 9 are flow charts for explaining the contents of the write processing in FIG. 3.

Assume that predetermined data is to be written at block number "1000" of optical disk 28 corresponding to group 2/disk number "2" in FIG. 2A. In this case, disk number "2" of write optical disk 28, block number "1000" indicating a block position at which the data is to be written, and a buffer in which the write block data has already been stored, e.g., block buffer 2, are specified from the group management table shown in FIG. 2A.

When disk number "2" of write optical disk 28 is specified, disk number "11" of the parity disk belonging to group 2 of optical disk 28 of disk number "2" is obtained by referring to the group management table in FIG. 2A (step ST240).

Subsequently, optical disks 28 of data disk number "2" and parity disk number "11" are loaded into some of optical disk drives 201 to 204 by the disk load processing described with reference to FIG. 5 (step ST242).

When loading of the disks of data disk number "2" and parity disk number "11" into the optical disk drives (two drives of drives 201 to 204) is completed, block data recorded at block number "1000" of optical disk 28 of disk number "2" is read out and stored in work buffer 1 (step ST244).

If an error occurs in the data read operation with respect to block number "1000" of optical disk 28 of disk number "2" (YES in step ST246), an error is determined, and the write processing is terminated.

If this data read operation is properly completed (NO in step ST246), block data recorded at block number "1000" of parity disk 28 of parity disk number "11" is read out and stored in work buffer 2 (step ST248).

If an error occurs in the data read operation with respect to block number "1000" of optical disk 28 of disk number "11" (YES in step ST250), an error is determined, and the write processing is terminated.

If this data read operation is properly completed (NO in step ST250), an xor operation is performed between the block data (written data) in work buffer 2 and the block data (the readout data corresponding to disk number "2"/block number "1000"), and the operation result is stored in work buffer 3 (step ST252).

Subsequently, an xor operation is performed between the block data (the operation result obtained in step ST252) in work buffer 3 and the block data (the parity data corresponding to disk number "11"/block number "1000") in work buffer 2, and the operation result (new parity data) is stored in work buffer 4 (step ST254).

After the new parity data is obtained in work buffer 4 in this manner, the write block data in block buffer 2 is written at block number "1000" of data optical disk 28 of disk number "2" (step ST256), and the new parity data in work buffer 4 is written at block number "1000" of parity optical disk 28 of disk number "11" (step ST258).

Subsequently, the drive management table shown in FIG. 2C is referred. "1" is added to the column "access times" corresponding to the drive number (e.g., "2") of the optical disk drive (e.g., drive 202) into which data optical disk 28 of disk number '2" is loaded (step ST260). In addition, "1" is added to the column "access times" corresponding to the drive number (e.g., "4") of the optical disk drive (e.g., drive 204) into which parity disk 28 of disk number "11" is loaded (step ST260).

In this manner, the data write processing accompanied by parity data update processing is completed.

Figure 10:
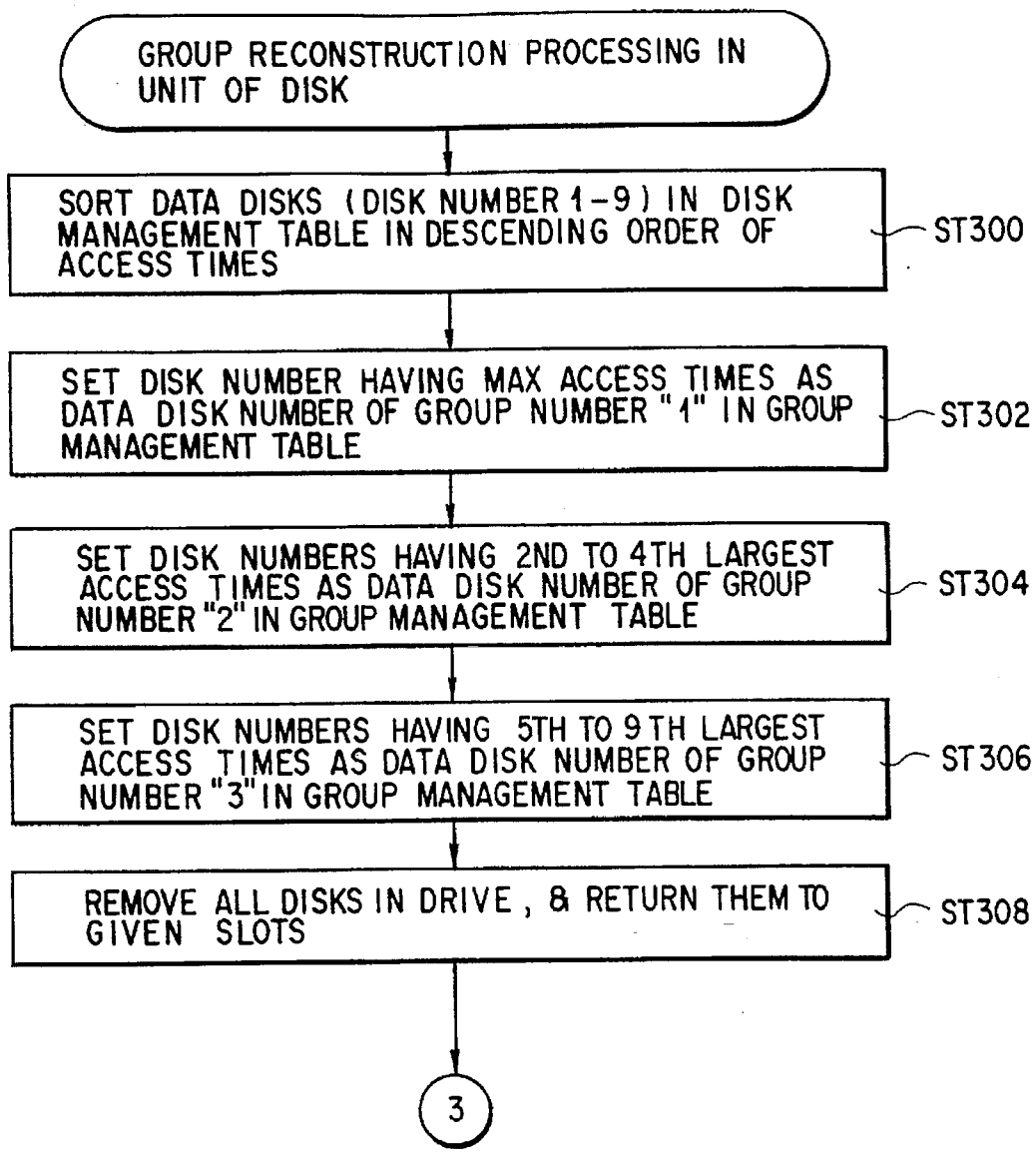
FIG. 10 is a flow chart for explaining the first portion of the contents of group reconstruction processing (processing in units of disks) in FIG. 3.
Figure 11:
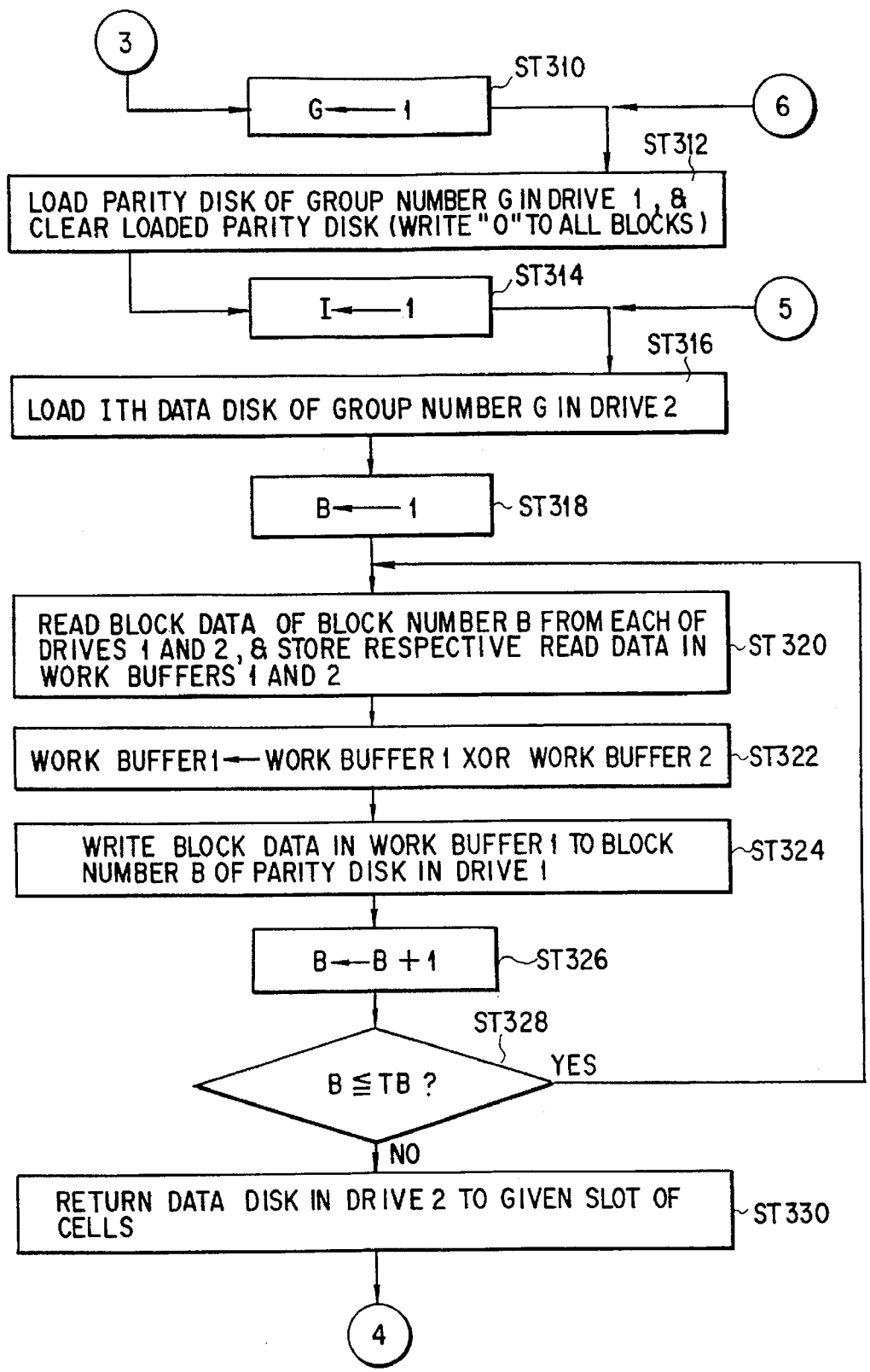
FIG. 11 is a flow chart for explaining the middle portion of the contents of the group reconstruction processing in FIG. 3.

FIGS. 10 to 12 are flow charts for explaining the group reconstruction processing (processing in units of disks) in FIG. 3.

FIGS. 14A and 14B show a group management table and a disk management table which are obtained after the disk array apparatus in FIG. 1 is operated for a certain period of time. FIGS. 15A and 15B show a table obtained by sorting and rearranging the numbers of access times of the respective disks, recorded in the disk management table in FIG. 14B, in the descending order, and a group management table updated in accordance with the result of this rearrangement.

Referring to FIG. 10, the disk management table shown in FIG. 14B is loaded into memory 14, and disk numbers "1" to "9" of the data disks are sorted in the descending order of the numbers of access times in the past (step ST300). As a result of this sorting, the contents of the disk management table in FIG. 14B are changed, as shown in FIG. 15B.

That is, a disk (disk number "4") with a high access frequency (900 times) is housed in a cell (cell number "1") near the inlet/outlet of cell section 24 to shorten the time required for the disk to move between optical disk drives 201 to 204 and cell section 24. In contrast to this, with regard to a disk with a low access frequency, even if disk load processing takes much time, the overall operating efficiency of the apparatus (a reduction in processing time) is not so influenced. Therefore, such a disk (disk number "9") with a low access frequency (5 times) is housed in a cell (cell number "9") located far from the inlet/outlet of cell section 24.

In addition, a disk (disk number "4") with a high access frequency (900 times) is assigned to group 1 constituted by a small number of disks to realize high-speed recovery processing at the occurrence of an error (step ST302).

With regard to disks with intermediate access frequencies, the influences of the recovery processing times on the overall operating efficiency of the apparatus are relatively small. Therefore, disks (disk numbers "2", "1", and "7") with intermediate access frequencies (150 to 500 times) are assigned to group 2 constituted by an intermediate number of disks (step ST304).

With regard to disks with low access frequencies, even if disk load processing takes times, the operating efficiency (a reduction in processing time) of the apparatus is not so influenced as a whole. Therefore, disks (disk numbers "3", "5", "6", "8", and "9") with relatively low access frequencies (5 to 100 times) are assigned to group 3 constituted by a large number of disks (step ST306).

As a result, the group management table shown in FIG. 14A is changed, as shown in FIG. 15A. When updating of the contents of the group management table (group reconstruction in units of disks) is completed in this manner, all optical disks 28 in optical disk drives 201 to 204 are removed. Removed optical disks 28 are stored in the cells of predetermined cell numbers in accordance with the contents of the disk management table shown in FIG. 15B (step ST308).

When the contents of the group management table are updated in the above-described manner, the contents the parity disks (disk numbers "10" to "12") of the respective groups must be updated. This update processing is performed according to the sequence shown in the flow charts in FIGS. 11 and 12.

First of all, "1" is set in group number parameter G to update the parity data corresponding to group number "1" (step ST310).

The parity disk (disk number "10") of group G (group 1) is then loaded into optical disk drive 201 of drive number "1", and data "0" is written in all the blocks of the loaded parity disk, thus clearing the parity disk of disk number "10" (step ST312).

Subsequently, "1" is set in disk parameter I corresponding to group G (=1) (step ST314). (This disk parameter I takes one of "1" to "5", as indicated by the column "data disk number" in FIG. 15A). As a result, the disk of disk parameter I (=1) corresponding to group G (=1), i.e., the data disk of disk number "4", is loaded into optical disk drive 202 of drive number "2" (step ST316).

With regard to the parity and data disks respectively loaded into drives 201 and 202 of drive numbers "1" and "2", "1" is set in block parameter B indicating the block number of each of these disks (step ST318).

After this operation, block data (all data are "0" at this time point) is read out from block number "1" of the parity disk loaded into drive 201. The readout data is stored in work buffer 1. In addition, block data (the contents of the disk of disk number "4") is read out from block number "1" (=B) of the data disk loaded into drive 202. The readout data is stored in work buffer 2 (step ST320).

An xor operation is performed between the block data (the readout data corresponding to block number "1" of parity disk 28 of disk number "10") in work buffer 1 and the block data (the readout data corresponding to block number "1" of data disk 28 of disk number "4") in work buffer 2. The operation result is stored in work buffer 1 (step ST322). The contents of work buffer 1, obtained in this manner, are written at block number "1" (=B) of the parity disk (disk number "10") (step ST324).

After this operation, block number B is incremented by one (step ST326), and incremented block number B (=2) is compared with total block number TB (e.g., 10,000) of optical disk 28 (step ST328). In this case, since B≦TB (YES in step ST328), the parity data write processing in steps ST320 to ST324 is performed with respect to the block data at block number "2", and block number B is further incremented by one (step ST326).

After the above parity write processing is repeated the number of times corresponding to total block number TB (NO in step ST328), the data disk (disk number "4") is taken out from drive 202 and returned to the corresponding slot (cell number "1" in the case shown in FIG. 15B) of cell section 24 (step ST330).

When parity data write processing with respect to the disk corresponding to group 1 and disk number "4" is completed, disk parameter I of group G (=1) is incremented by one (step ST332).

At this time, number N−1 (=1) obtained by subtracting "1" from number N (=2) of disks constituting group B (=1) (i.e., the number obtained by subtracting "1" as the number of parity disks from the total disk number of the group) is compared with disk parameter I (=2) of group G (=1), which is incremented in step ST332 (step ST334).

Since I (=2)≦N−1 (=1) is not satisfied (NO in step ST334), the parity disk (disk number "10") in drive 201 is returned to the slot position corresponding to cell number "10" of cell section 24 (step ST336), and group parameter G is incremented by one (step ST338). With this increment, G=2.

In this case, group parameter G (=2) is compared with the maximum number (=3) of the group (step ST340). Since G (=2)≦3 (YES in step ST340), the processing in steps ST312 to ST336 is executed again with respect to the parity disk (disk number "11") and the data disks (disk numbers "2", "1", and "7") of group 2 with "number of disks"="4".

Subsequently, group parameter G (=3) incremented again in step ST338 is compared with the maximum number (=3) of the group (step ST340). Since G (=3)≦3 (YES in step ST340), the processing in steps ST312 to ST336 is executed again with respect to the parity disk (disk number "12") and the data disks (disk numbers "3", "5", "6", "8", and "9") of group 3 with "number of disks"="6"

In this manner, updating of parity data (redundant data for error correction) upon group reconstruction is completed. In this case, of the disk numbers in the drive management table, numbers corresponding to four drives are sequentially selected from the uppermost position in accordance with the contents of the disk management table shown in FIG. 15B, and are set, for example, as shown in FIG. 15C.

After this operation, group parameter G (=4) which is incremented again in step ST338 is compared with the maximum number (=3) of the group (step ST340). Since G (=4)≦3 is not satisfied this time (NO in step ST340), optical disks 28 of disk numbers "4", "2", "1", and "7" are respectively loaded into optical disk drives 201 to 204 of drive numbers "1" to "4" in accordance with the contents of the drive management table in FIG. 15C (step ST342). In this manner, the group reconstruction processing is completed.

If accessor 26 is designed to load optical disks 28 into predetermined optical disk drives at the same speed regardless of the slots (cell numbers "1" to "12") of cell section 24 at which optical disks 28 are located, the disk numbers need not be rearranged in accordance with the cell numbers as shown in FIG. 15B. In this case, the tables shown in FIGS. 15A and 15B are changed to the tables shown in FIGS. 16A and 16B, respectively.

After the group reconstruction processing is completed, the value of the column "access times" corresponding to each disk number in the disk management table is reset to "0", and each past "access times" data is added to the corresponding column "accumulated access times". FIG. 16B shows a state in this case.

The group reconstruction processing shown in FIGS. 10 to 12 is time-consuming processing (especially steps ST320 to ST328 in FIG. 11) because the processing accompanies a large amount of data operation processing. Therefore, this group reconstruction processing may be performed by issuing commands from an external device (host computer) via communication line 30 at night at which the apparatus in FIG. 1 is used at a low frequency or in a holiday in which the operation of the apparatus is stopped.

Figure 17:
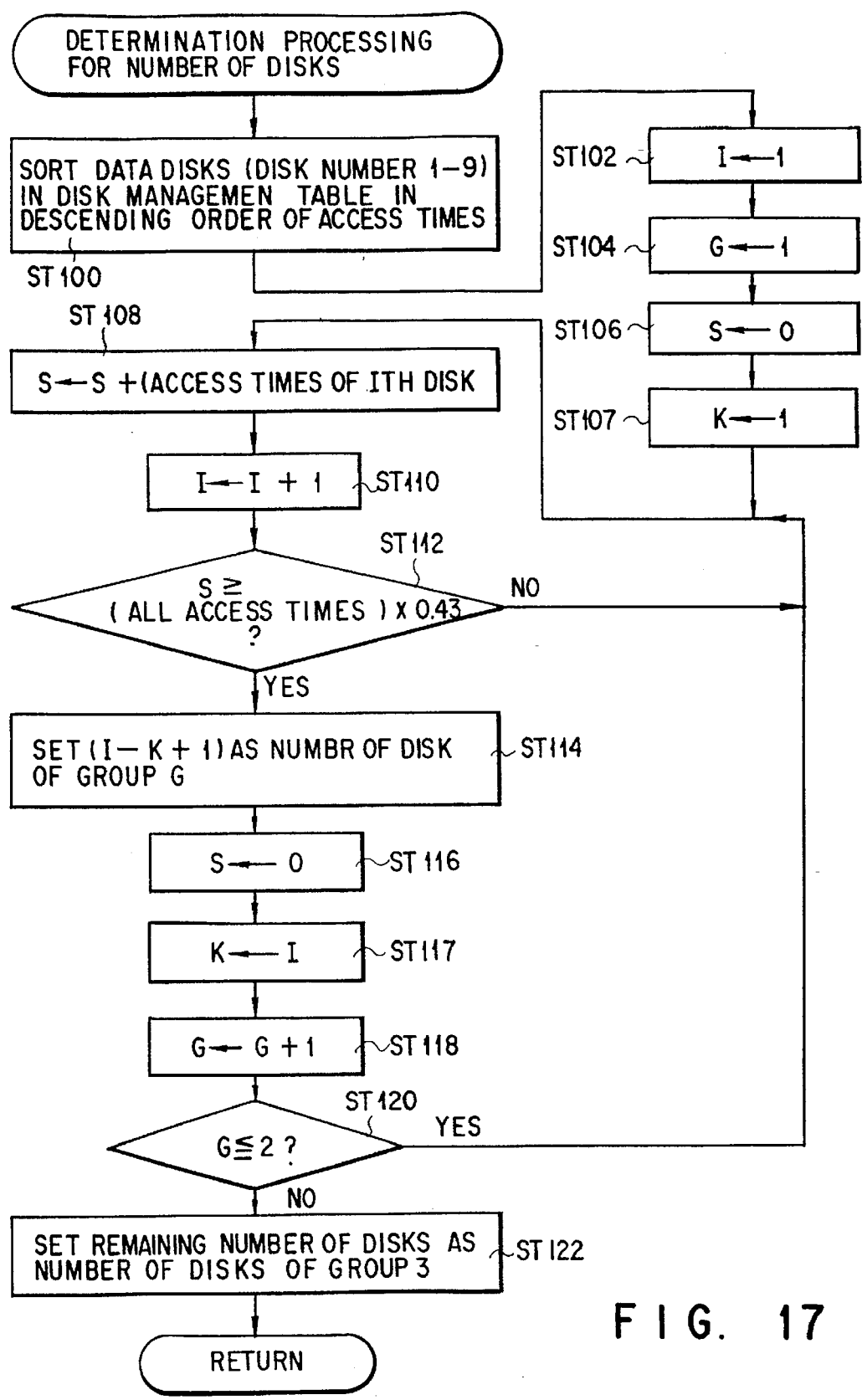
FIG. 17 is a flow chart for explaining the process of determining the number of disks constituting a disk group managed by a group management table.

FIG. 17 is a flow chart for explaining how the number of disks constituting a disk group managed by a group management table is determined.

First, a disk management table like the one shown in FIG. 14B is loaded into memory 14, and disk numbers "1" to "9" of data disks are sorted in the descending order of the numbers of access times in the past (step ST100). As a result of this sorting, the contents of the disk management table in FIG. 14B are changed to those shown in FIG. 15B.

Subsequently, parameter I is set for each disk in the sorting order, and "1" is substituted as an initial value (step ST102). Parameter G is set for each of three groups, and "1" is substituted as an initial value (step ST104). In addition, "0" is substituted, as an initial value, in parameter S for storing the total number of access times (step ST106). "1" is substituted in temporary variable storage parameter K (step ST107).

The number of access times (900 times) with respect to the first sorted disk (disk number "4" in this case) is added to parameter S (step ST108).

After this operation, parameter I is incremented by one (step ST110). It is checked whether the value of parameter S is larger than, e.g., 43% (882 times) of the total access times (2.052 times) of all the disks (step ST112). (The value "43%" is empirically determined from the result of the operation of the apparatus in FIG. 1.)

In this case, since S (=900)≧45% (=882) of the total number of access times (YES in step ST112), the number of disks corresponding to group number G (=1) is given by I (=2)–K (=1)+1 (corresponding to one parity disk). In this case, the number of disks is "2" (step ST114).

In this manner, the number of disks corresponding to group number "1" in the group management table shown in FIG. 15A is determined to be "2".

After this operation, "0" is substituted in parameter S (step ST116), and the current value of parameter I is substituted in parameter K (step ST117). Thereafter, parameter G is incremented by one (step ST118).

It is checked whether parameter G is equal to or smaller than "2" (step ST120). In this case, since G=2, the flow returns to step ST108 to increment parameter S by the number corresponding to the number of access times with respect to the Ith disk (step ST108).

If parameter S (=950) is equal to or larger than 43% (=882) of the total number of access times when parameter I becomes "4" in step ST110, the number of disks constituting group 2 is determined to be I (=4)–K (=1)+1=4 (step ST114).

Subsequently, when parameter G is incremented by one in step ST118 to set G=3 (NO in step ST120), the number (=6) of remaining disks, obtained by subtracting the sum (=6) of disks constituting groups 1 and 2 from the total number (=12) of data disks, is determined as the number of disks constituting group 3.

The following is an example of how the processing speed varies depending on whether the present invention is applied to a disk array apparatus.

FIG. 18 shows an example of the number of disk loading times in a disk apparatus to which the present invention is not applied. This case is based on the following assumption. Nine optical disks 28 are used for data, and three optical disks 28 are used for parity. These 12 optical disks 28 are classified into three groups, and each group is constituted by three data disks, and one parity disk.

FIG. 19 shows an example of the number of disk loading times in the disk array apparatus according to an embodiment of the present invention. This case is based on the following assumption. As shown in FIG. 2A and some other drawings, nine optical disks 28 are used for data, and three optical disks 28 are used for parity. These 12 optical disks 28 are classified into three groups. The first group is constituted by one data disk and one parity disk; the second group, three data disks and one parity disk; and the third group, five data disks and one parity disk, in the order of descending access frequencies.

Under the above assumption, consider a case wherein only one disk drive is used; access is made for only read processing; the error rate in read processing is 10%; and a read command is supplied 100 times from an external device (host computer) via communication line 30.

Referring to FIGS. 18 and 19, the column "command access times" indicates how 100 command accesses from the external device are distributed to the respective optical disks. In both the tables shown in FIGS. 18 and 19, the command accesses are distributed in the same manner.

The column "access times of recovery processing" indicates the number of times each disk is accessed for recovery from a read operation. For example, the optical disk of disk number "1" is read-accessed 80 times. Since the error rate is assumed to be 10%, eight errors occur. In this case, the disks in group 1 other than the disk in error and the parity disk in group 1 are respectively accessed eight times.

In the case shown in FIG. 18, therefore, the number of times that the disk of disk number "1" is accessed for recovery processing is 1.2 on average, which is 10% of the sum of the numbers of times an access error occurs with respect to the disks of disk numbers "2" and "3" in group 1, i.e., (7+5).

In contrast to this, in the case of the embodiment of the present invention shown in FIG. 19, since there are no disks of disk numbers "2" and "3" in group 1, no access is made to the disk of disk number "1", unlike the case shown in FIG. 18 in which the number of access times is 1.2 on average.

When the total numbers of access times of recovery processing in the two tables shown in FIGS. 18 and 19 are compared with each other, it is found that "30" as the total number in the case shown in FIG. 18 is reduced to "15.2" in the case of the embodiment in FIG. 19. This is an effect based on assignment of a disk (disk number "1") with a high access frequency to a group (group 1) constituted by a small number of disks.

Referring to FIG. 18, the column "rate of access" indicates a value obtained by dividing the sum of the number of command access times and the number of access times of recovery processing with respect to each disk (80+1.2=81.2 for disk number "1") by the sum (130) of the total number (100 times) of command access times and the total number (30 times) of access times of recovery processing. Referring to FIG. 19, the column "rate of access" indicates a value obtained by dividing the sum of the number of command access times and the number of access times of recovery processing with respect to each disk (80+0=80 for disk number "1") by the sum (115.2 times) of the total number (100 times) of command access times and the total number (15.2 times) of access times of recovery processing.

The column "disk loading times" indicates the number of times that each disk is loaded in a drive, which is obtained from the total number of access times with respect to each disk and the corresponding rate of access. That is, number of disk loading times=(probability that different disk is accessed before load processing) * (number of access times) =(1–rate of access) * (number of access times).

When the tables shown in FIGS. 18 and 19 are compared with each other, it is found that the number of disk loading times is as large as 75.4 in the case shown in FIG. 18, whereas the number of disk loading times is only 58.1 in the case of the embodiment shown in FIG. 19. That is, the number of disk loading times can be reduced by 25% by the embodiment of the present invention. This is also an effect based on assignment of a disk (disk number "1") with a high access frequency to a group (group 1) constituted by a small number of disks.

The comparative examples shown in FIGS. 18 and 19 are based on the assumption that only one disk drive is used. However, the same effects can be obtained even if two or more drives are used.

Group reconstruction in units of disks has been described with reference to FIGS. 10 to 12. However, this group reconstruction can also be performed in units of blocks in one disk.

Group reconstruction processing in units of blocks will be described below.

A disk block management table to be referred in this group reconstruction in units of blocks is arranged as shown in FIGS. 22 and 23. In this management table, "cell number", "access times", "accumulated access times", "physical disk number" for managing an actual relationship with optical disk 28, and "physical block number" are prepared for each block.

Assume that data access is to be made in accordance with a command sent from an external device via communication line 30. In this case, optical disk 28 to be actually accessed is determined by referring to the disk block management table.

Note that a group management table and a drive management table used for group reconstruction processing in units of blocks may have the same arrangements as those shown in FIGS. 2A and 2C. However, all the disk numbers in the tables shown in FIGS. 2A and 2C are replaced with physical disk numbers in group reconstruction processing in units of blocks.

FIG. 20 is a flow chart for explaining a case wherein the group reconstruction processing in FIG. 3 is performed in units of blocks in each disk.

To begin with, "1" is set in parameter i indicating a line in the disk block management table in FIG. 22 (step ST400). Similarly, "y" is set in parameter j indicating a line in this table (step ST402). The value "y" set in this case indicates the total number of lines (e.g., 9,000) of the disk block management table.

By referring to the table shown in FIG. 22, the number of access times (15 times) with respect to disk number "9"/ block number "1000" of j lines (=y) is compared with the number of access times with respect to (j–1) lines (=y–1) (step ST404). If the number of access times with respect to (j–1) lines is larger (YES in step ST404), block exchange processing with respect to j lines and (j–1) is performed (step ST406). This block exchange processing will be described later with reference to FIG. 21.

If the number of access times with respect to j lines is larger than the number of access times with respect to (j–1) lines (NO in step ST404), parameter j is decremented by one without performing block exchange processing (step ST408).

If decremented parameter j is equal to or larger than (i+1) (2 in this case) (YES in step ST410), the number of access times with respect to j lines is compared again with the number of access times with respect to (j–1) (step ST404). If the number of access times with respect to (j–1) is larger (YES in step ST404), block exchange processing with respect to j lines and (j–1) lines is performed (step ST406). After this operation, parameter j is decremented again by one (step ST408), and decremented parameter j is compared with (i+1) (2 in this case) (step ST410).

If YES in step ST404, block exchange processing is repeated until parameter j becomes less than (i+1) (NO in step ST410).

Subsequently, parameter i is incremented by one (step ST412), and the processing in steps ST402 to ST412 is repeated while incremented parameter i is equal to or smaller than (y—1) (YES in step ST414).

When parameter i is incremented to "y" (NO in step ST414), "accumulated access times=access times+ accumulated access times" is calculated for all the lines of the table in FIG. 22, and the result is written (step ST416). Thereafter, parity disk update processing similar to that described with reference to FIG. 11 is performed (step ST418), and the processing in FIG. 20 is completed.

As a result of the sort processing in steps ST400 to ST416 in FIG. 20, the disk block management table shown in FIG. 22 is updated as shown in FIG. 23. This sort processing can be realized by a known algorithm (e.g., a bubble sorting method).

FIG. 21 is a flow chart for explaining the block exchange processing in FIG. 20.

First of all, optical disks 28 corresponding to the physical disk numbers of the ith and jth lines of the disk block management block in FIG. 22 are loaded into two drives of optical disk drives 201 to 204 (step ST4060).

Subsequently, block data indicated by the physical block number of the ith line is read out from one optical disk drive into which the physical disk corresponding to the ith line is loaded, and the readout data is stored in work buffer 1 (step ST4062).

Block data indicated by the physical block number of the jth line is read out from the other optical disk drive into which the physical disk corresponding to the jth line is loaded, and the readout data is stored in work buffer 2 (step ST4064).

After this operation, the block data stored in work buffer 1 is written at the corresponding physical block number of the optical disk drive into which the physical disk corresponding to the jth line is loaded (step ST4066).

The block data stored in work buffer 2 is written at the corresponding physical block number of the optical disk drive into which the physical disk corresponding to the ith line is loaded (step ST4068).

Finally, the data of the ith line and the data of the jth line are exchanged with each other with respect to five items from "disk number" to "accumulated access times" in the disk block management table (step ST4070), and the block exchange processing is completed.

FIG. 22 shows an example of the disk block management table before group reconstruction processing is performed in units of blocks. FIG. 23 shows an example of the disk block management table after group reconstruction processing is performed in units of blocks.

In these disk block management tables, block data are exchanged with each other across the disks in the descending order of the numbers of access times. For example, with regard to disk number "2" corresponding to the maximum number of access times, the actual location of the block data at block number "2" is changed from physical disk number "2"/physical block number "1" to physical disk number "1"/physical block number "1" (the start position in FIG. 23).

After such exchange of block data locations is completed, parity data is generated for each of the disk groups (1 to 3) and is written in the parity disk of each group, thus completing the processing. In this case, the physical disk numbers constituting the respective groups are not changed.

If block exchange processing is performed in units of blocks in accordance with the number of access times (access frequency) of each block, data with high access frequencies can be made to concentrate in a group (1) constituted by a small number of disks. With this processing, the number of times that an optical disk with a high access frequency is exchanged can be minimized. If an error occurs in this disk, since the disk belongs to a group constituted by a small number of disks (two in the table shown in FIG. 2A), the recovery processing time for error recovery can be minimized.

According to the present invention, the respective disks (or the information recording blocks of the respective disks) are grouped in accordance with the access frequencies. Therefore, there is provided a disk array apparatus which allows high-speed access as a whole (because parallel access can be made to a plurality of groups), realizes high reliability (because each group has a parity disk, and error recovery processing can be performed even if an error occurs in a data disk), and has a large storage capacity (because in a disk group with a low access frequency, the ratio of the parity disk capacity to the total capacity is set to be low).

In a disk array apparatus capable of arbitrarily assigning a plurality of disks (1–12) to a plurality of disk groups (1–3), a plurality of groups (three in the embodiment), each constituted by number N of disks, (at least one of the disks in each group is used as a parity disk, and the remaining disks are used as data disks) are prepared. Each group is constituted by a different number of disks (N=2, 4, 6 in FIG. 15A). The access frequencies with respect to the disks of each group are recorded (a disk management table). A disk (4) with a high access frequency is set in a group (1) constituted by a small number of disks (N=2), whereas disks (3, 5, 6, 8, 9) with low access frequencies are set in a group (3) constituted by a large number of disks (N=6).

In a group (1) constituted by a small number of disks, since the number of disks used for a calculation (xor operation) for error recovery processing is small (N=2), high-speed recovery processing can be realized. On the other hand, in a group (3) constituted by a large number of disks (N=6), since the ratio of the parity disk capacity to the total capacity of the group is low (1/6), the disk capacity (redundancy) which cannot be used for data storage can be relatively reduced. In the group (3) constituted by a large number of disks, the recovery processing speed is low because the number of disks used for a calculation (xor operation) for recovery processing is large (N=6). However, since the access frequency of this group is low, the time taken for recovery processing is not much from the viewpoint of the overall operation of the apparatus.

The present invention can be applied to apparatuses using semiconductor disks (an IC card array), a magnetic tape cassette array (an automatic tape changer) as well as apparatuses using optical disks and magnetic disks.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A disk array apparatus using a plurality of disks, comprising:

a plurality of disk drives each for executing data access to each of the disks;

means for counting number of times of data access with respect to each of the disks, said data access being executed by any of said disk drives;

first management means for managing the number of times of the data access counted by said counting means with respect to each of the disks;

second management means for managing one or more media groups each containing a plurality of the disks, the disks of each of said media groups including one or more data disks each for storing data and one or more parity disks each for storing parity data which is used for recovering the data stored in said data disks; and means for assigning the data disks stored data to one of the media groups managed by said second management means, in accordance with the number of times of the data access managed by said first management means.

2. A disk array apparatus using a plurality of disks, comprising:

a plurality of disk drives each for executing data access to each of the disks;

means for counting number of times of data access with respect to each of the disks, said data access being performed by any of said disk drives, and the plurality of the disks containing first and second disks;

first management means for managing the number of times of the data access counted by said counting means with respect to the first and second disks, where the number of times of the data access with respect to the first disk is larger than that with respect to the second disk;

second management means for managing first and second media groups each containing a plurality of the disks, the disks of each of said media groups including one or more data disks each for storing data and one or more parity disks each for storing parity data which is used for recovering the data stored in said data disks, where number of disks constituting the first media group is smaller than that constituting the second media group; and means for assigning the first and second disks, managed by said first management means, to first and second media groups managed by said second management means, said assigning means including first assigning means for assigning the first disk to the first media group to be based on numbers of times of the data access with respect to the first and second disks, and to be based on numbers of disks constituting the first and second media groups, and second assigning means for assigning the second disk to the second media group.

3. A data storage apparatus including at least one data storage medium and at least one parity storage medium, comprising:

first storage means for storing group management information concerning at least one group, each said group being constituted by said data storage medium and said at least one parity storage medium, said management information specifying a relationship between each said group and the data storage medium constituting said group;

means for writing redundancy data, associated with data recorded on data storage media in the same group, in a parity storage medium in each of said groups;

second storage means for storing medium management information for specifying a relationship between said data storage medium and number of access times with respect to said data storage medium; and means for detecting a data storage medium with a large number of access times from the medium management information, specifying a group constituted by a small number of storage media from the group management information, and assigning said detected storage medium with a large number of access times to said group constituted by a small number of storage media.

4. A data storage apparatus using a plurality of information recording disks constituted by data and parity disks, comprising:

a housing section for detachably housing said plurality of information recording disks;

a plurality of information read/write sections for reading/writing data from/in said plurality of information recording disks;

a convey section for conveying each of said information recording disks between said storage section and said information read/write sections;

a group management section for storing group management information for specifying a relationship between each of a plurality of groups and disks constituting said group, each of said plurality of groups being constituted by said data and parity disks;

means for writing redundancy data, associated with data recorded on data disks in the same group, in a parity disk in said group;

a disk management section for storing disk management information specifying a relationship between each of said plurality of information recording disks and the number of access times with respect thereto; and means for detecting a disk with a large number of access times from the disk management information, specifying a group constituted by a small number of disks from the group management information, and assigning said detected disk with a large number of access times to said group constituted by a small number of disks.

5. An apparatus according to claim 4, further comprising means for detecting a disk with a small number of access times from the disk management information, specifying a group constituted by a large number of disks from the group management information, and assigning said detected disk with a small number of access times to said group constituted by a large number of disks.

6. An apparatus according to claim 4, further comprising:

a plurality of disk drives constituting said information read/write sections and arrayed in a predetermined order;

a drive management section for storing drive management information specifying a relationship between each of said plurality of information recording disks and each of said disk drives into which said disks are loaded; and means for detecting a disk with a large number of access times from the disk management information, and changing the drive management information to assign said detected disk with a large number of access times to a portion of an array of said plurality of disk drives.

7. A data storage apparatus using a plurality of information recording disks constituted by data and parity disks, comprising:

a group management section for storing group management information for specifying a relationship between each of a plurality of groups and disks constituting said group, each of said groups being constituted by said data and parity disks;

means for writing redundancy data, associated with data recorded on data disks in the same group, in a parity disk in said group;

a disk management section for storing disk management information for specifying a relationship between each of said disks and the number of access times with respect thereto; and means for sorting said disks in an order of descending number of access times of said disks, based on the disk management information;

first determining means for determining a number of disks in a group of said disks, said group being constituted by disks which have been accessed more than a predetermined number of times; and second determining means for determining a number of disks of another group of said disks, said other group being constituted by a number of disks based on disks other than disks in said first group of disks.

8. An apparatus according to claim 7, further comprising means for assigning a disk having a large number of access times, said disk being selected based on the sort processing, to said group constituted by a small number of disks.

9. A data storage apparatus for reading/writing data from/in a plurality of information recording media constituted by a data disk having a plurality of information recording blocks and a parity disk having a plurality of information recording blocks, comprising:

means for writing redundancy data, associated with data recorded on said data disk, in said parity disk in units of information recording blocks of said disks;

a disk block management section for recording the number of access times with respect to each of the information recording blocks of said data disk; and means for detecting blocks with large numbers of access times from said disk block management section and collectively assigning the detected blocks with large numbers of access times to a single disk.

* * * * *